（12） United States Patent
Horn et al.

(10) Patent No.: US 8,374,163 B2
(45) Date of Patent: Feb. 12, 2013

(54) SYNCHRONIZATION OF WIRELESS NODES

(75) Inventors: Gavin Bernard Horn, La Jolla, CA (US); Avneesh Agrawal, San Diego, CA (US); Ashwin Sampath, Princeton, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1215 days.

(21) Appl. No.: 11/938,058

(22) Filed: Nov. 9, 2007

(65) Prior Publication Data

US 2009/0122782 A1    May 14, 2009

(51) Int. Cl.
*H04J 3/06* (2006.01)
*H04J 3/16* (2006.01)
(52) U.S. Cl. ........ 370/347; 370/350; 370/458; 370/468; 370/509
(58) Field of Classification Search .................. None
See application file for complete search history.

(56) References Cited

U.S. PATENT DOCUMENTS

| | | | |
|---|---|---|---|
| 7,675,884 B2 | 3/2010 | Ye | |
| 2005/0135284 A1* | 6/2005 | Nanda et al. | 370/294 |
| 2006/0280199 A1* | 12/2006 | Lane et al. | 370/458 |
| 2007/0014269 A1* | 1/2007 | Sherman et al. | 370/338 |
| 2007/0086424 A1* | 4/2007 | Calcev et al. | 370/350 |
| 2007/0105574 A1 | 5/2007 | Gupta et al. | |
| 2007/0116063 A1* | 5/2007 | Hardy et al. | 370/508 |
| 2007/0121545 A1* | 5/2007 | Park et al. | 370/329 |
| 2007/0135115 A1* | 6/2007 | Sawada | 455/422.1 |
| 2008/0070510 A1* | 3/2008 | Doppler et al. | 455/69 |
| 2008/0130593 A1* | 6/2008 | Scheinert et al. | 370/337 |
| 2009/0034459 A1* | 2/2009 | Shousterman et al. | 370/329 |

OTHER PUBLICATIONS

Ebner, Andre et al., "Decentralized Slot Sychronization in Highly Dynamic Ad Hoc Networks," Department of Telecommunications Technical University of Hamburg; Lott et al.; Information and Communication Mobile, Germany, Oct. 27-30, 2002 IEEE, vol. 2, pp. 494-498, ISBN 0-7803-7442-8, ISSN 1347-6890.
Qi Yang, Jianghong Shi: "An Interference Elimination Method for Decentralized Slot Sychronization in TDMA—Based Wireless Ad Hoc Network," IEEE, Proceedings of 2007 International Symposium on Intelligent Processing and Communication System, Information Science and Technology College of Xiamen, China, Nov. 28-Dec. 1, 2007, pp. 236-23.

(Continued)

*Primary Examiner* — Chirag Shah
*Assistant Examiner* — Ashley Shivers
(74) *Attorney, Agent, or Firm* — Dang M. Vo

(57) ABSTRACT

A first wireless node may synchronize its timeslots with the timeslots of a second wireless node that was previously transmitting and receiving data in an asynchronous manner with respect to the timeslots of the first wireless node. By synchronizing timeslots, the wireless nodes may avoid interference that may otherwise occur if the wireless nodes operate in an asynchronous manner. A wireless node shares its timing information with other wireless nodes by repeatedly transmitting timing reference signals in conjunction with a synchronization metric that defines the relative priority of the timing reference. In the event a wireless node does not receive a GPS-based timing reference, the wireless node may synchronize to a timing reference based on the parameters of the synchronization metric of that timing reference. In the event a wireless node does not receive any timing references, the wireless node may define and advertise it's a timing reference and associated synchronization metric. To avoid synchronization race conditions, the synchronization metrics may be defined such that wireless nodes that have different timing references will advertise different synchronization metrics.

153 Claims, 17 Drawing Sheets

OTHER PUBLICATIONS

Carlos H. Rentel and Thomas Kunz: "Network Sychronization in Wireless Ad Hoc Networks," Department of Systems and Computer Engineering, Carleton University of Canada, Jul. 2004, pp. 1-34.

Kay Romer: "Time Synchronization in Ad Hoc Networks," Department of Computer Science, ETH Zurich, Switzerland, ACM 2001, pp. 173-182.

Hung-Yu Wei et al.: "Interference-Aware IEEE 802.16 WiMax Mesh Networks," Proceedings of 61st IEEE vehicular Technology Conference (VTC 2005 Spring), Sweden, May 29-Jun. 1, 2005, pp. 1-5.

Rui Zhao and B. Walke: "A synchronization scheme for the Wireless Channel-oriented Ad-hoc Multi-hop Broadband system, In Wireless World Reserch Forum (W-CHAMB)," Communication Networks, Prof. Dr.-Ing. Bernhard Walke, Aachen University of Germany, pp. 1-8, Jul. 2003.

Paal E. Engelstad : "802.11 and Mesh Networking: Overview of the Amendment for Wireless Local Area Mesh Networking"; IEEE 802 Plenary, Dallas Monday, Nov. 13, 2006, 6:30 pm.

Holger Karl and Andrea Willing "Protocols and Architectures for Wireless sensor Networks: Chapter 4 Physical Layer-Third European Workshop-Ad hoc and Sensor Networks," Computer Networks Group University Paderbom, 2005, pp. 85-109.

W. Steven Conner: "IEEE 802.11s Tutorial-Overview of the Amendment for Wireless Local Area Mesh Networking," IEEE 802 Plenary, Dallas, Nov. 13, 2006, pp. 1-93.

* cited by examiner

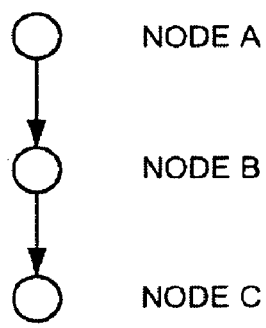
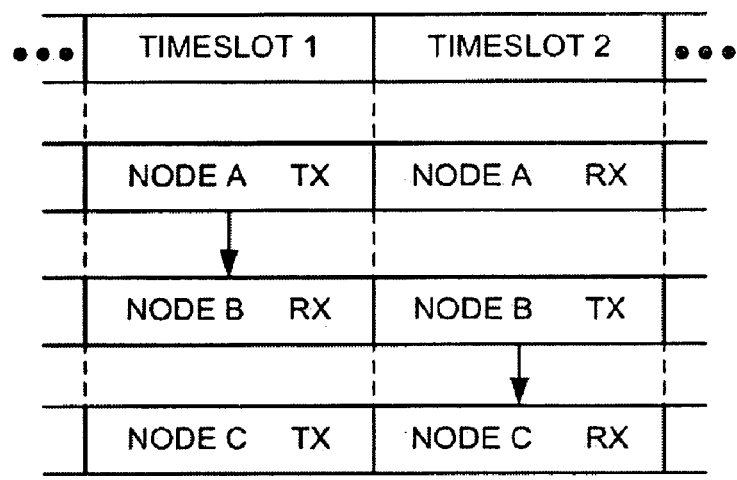
FIG. 2A  FIG. 2B

SYNCHRONIZATION OF WIRELESS NODES

BACKGROUND

1. Field

This application relates generally to wireless communication and more specifically, but not exclusively, to synchronizing wireless nodes.

2. Introduction

A wireless communication system may be deployed in various ways depending on the requirements of the intended application. For example, a planned deployment may be utilized for an application such as a cellular network where seamless connectivity is desired over a relatively wide area. To reduce interference in such a network, the channel or channels used by a given wireless device (or set of wireless devices) may be defined throughout the network. In addition, to further control interference in the network the wireless devices may communicate via designated timeslots whereby a given wireless device may transmit data during certain timeslots and receive data during other timeslots.

A more flexible deployment scheme may be used for an application such as a local area network that supports different types of wireless devices having different types of communication capabilities. For example, in such a network a set of wireless devices may unilaterally select their operating channel. In addition, the wireless devices may not use a timeslot structure for transmitting and receiving data. For example, in such a system a given wireless device may transmit data any time the selected channel is available. Here, an appropriate channel contention mechanism may be employed to prevent neighboring wireless devices from unduly interfering with one another.

In practice, the above deployment schemes may have certain disadvantages due to tradeoffs that may be made to provide a given type of service. For example, due to the relative complexity of centralized planning, setting up a planned wireless wide area network may be relatively expensive and time consuming. Hence, such a scheme may not be well suited for "hot spot" deployments. On the other hand, an unplanned wireless local area network may not achieve the same level of spatial efficiency (bits/unit area) as a planned network. In addition, interference mitigation techniques that may be used in unplanned networks may result in poor utilization, limited fairness control, and susceptibility to hidden and exposed nodes.

SUMMARY

A summary of sample aspects of the disclosure follows. It should be understood that any reference to the term aspects herein may mean one or more aspects of the disclosure.

The disclosure relates in some aspects to synchronizing timing between wireless nodes. For example, a first wireless node may be configured to determine whether a second wireless node is transmitting and receiving data via timeslots that are not synchronized with the first wireless node's timeslots. If the timeslots are not synchronized, the first wireless node may elect to synchronize its timeslots with the timeslots of the second wireless node if certain criteria are met.

In some aspects, if it is determined that the asynchronous transmission of data by a wireless node may interfere with the reception of data by another wireless node, the wireless nodes may synchronize their timeslots to avoid such interference. For example, once the wireless nodes are synchronized, the first wireless node may request that the second wireless node limit its transmissions during a given timeslot by, for example, refraining from transmitting or reducing its transmission power. If the second wireless node does limit its transmission, the first wireless node may thereby receive data during the designated timeslot without interference from the second wireless node. Furthermore, synchronizing timeslots allows for exchange of control information between communicating and interfering nodes in each timeslot, thereby enabling efficient interference management in data portions of each timeslot.

The wireless nodes share their respective timing information with other wireless nodes by repeatedly transmitting timing reference signals. Here, each of the timing reference signals are associated with a synchronization metric that defines the relative priority of the corresponding timing reference. In some aspects this relative priority relates to the reliability of the underlying timing reference. For example, a timing reference based on a global positioning system ("GPS") signal may be deemed to be more reliable (e.g., more stable) than a timing reference based on any non-GPS signal. The synchronization metrics thus provides an efficient mechanism by which a given wireless node may select the best timing reference from a set of potential timing references.

The synchronization metrics also may be used to avoid race conditions that may otherwise result when multiple wireless nodes are allowed to unilaterally select their timing references. As an example, a race condition could develop in the event a first wireless node attempts to synchronize with the timing of a second wireless node, and the second wireless node attempts to synchronize with the timing of the first wireless node. To avoid such a race condition, different wireless nodes that have different timing references will ultimately be assigned different synchronization metrics. Consequently, the priority of the timing reference of one of the wireless nodes will be higher than the priority of the timing reference of the other wireless node. Thus, when the two wireless nodes are attempting to find the best timing reference, a race condition may be avoided since the wireless node having the higher priority timing reference will not attempt to synchronize to the timing of the other wireless node.

In some aspects, in the event a wireless node does not receive a GPS-based timing reference, the wireless node may select a timing reference for synchronization based on other parameters of the synchronization metrics associated with any received timing references. These other parameters may relate to, for example, whether a timing reference is associated with a stationary device or a mobile device, a hop distance to a timing reference, and other suitable criteria that may be used to define a priority of a timing reference.

In some aspects, in the event a wireless node does not receive any timing reference or receives conflicting timing reference signals (e.g. claiming to be from the same timing source, but having different actual timing), the wireless node may define its own timing reference. In this case, the wireless node generates a synchronization metric associated with the timing reference and transmits that synchronization metric to neighboring wireless nodes to enable these nodes to synchronize to the corresponding timing reference.

In some aspects, a timing reference received by a wireless node of a cluster of wireless nodes (e.g., a set of nodes that have associated with one another) may be distributed to the other wireless nodes of the cluster. For example, a root access point of a cluster may monitor all of the timing references received by the nodes of the cluster. After determining which wireless node of the cluster is receiving the best timing reference, the root access point may cause this timing reference to be distributed to all of the nodes of the cluster.

BRIEF DESCRIPTION OF THE DRAWINGS

These and other sample aspects of the disclosure will be described in the detailed description and the appended claims that follow, and in the accompanying drawings, wherein:

FIG. 2, including FIGS. 2A and 2B, is a simplified diagram of several sample aspects of slotted communication;

FIG. 10, including

FIG. 11, including

Figure 1:
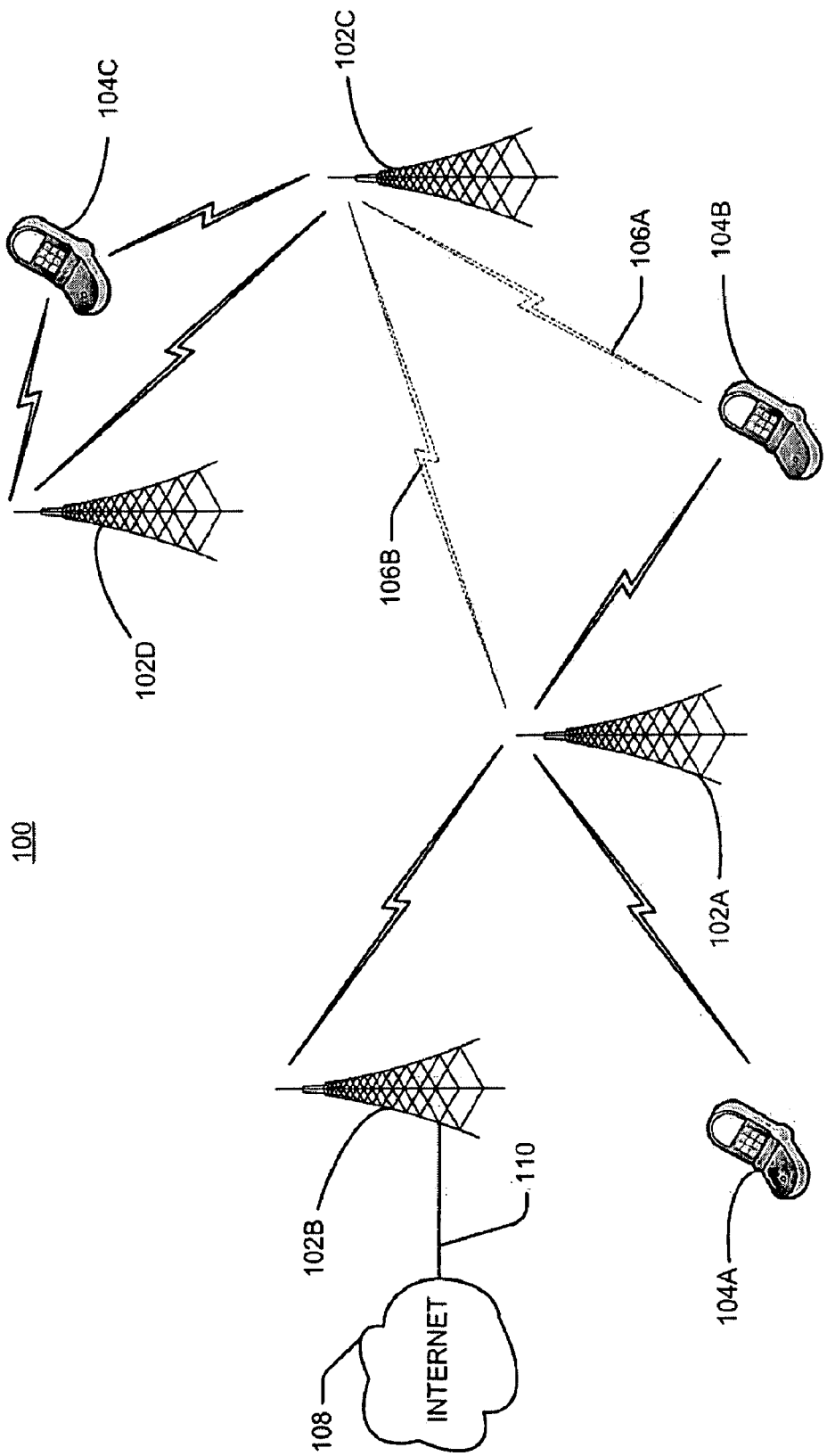
FIG. 1 is a simplified diagram of several sample aspects of a wireless communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a wireless communication method comprises determining whether a first wireless node causes or may cause interference with communication associated with a second wireless node, and synchronizing timing of the first and second wireless nodes to control the interference. In addition, in some aspects the synchronization is based on a synchronization metric transmitted by the first wireless node or the second wireless node.

FIG. 1 illustrates several sample aspects of a wireless communication system 100. The system 100 includes several wireless nodes, generally designated as nodes 102 and 104. A given node may receive one or more traffic flows, transmit one or more traffic flows, or both. For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in a variety of ways. For example, in some implementations a node may comprise an access terminal, a relay point, or an access point. Referring to FIG. 1, the nodes 102 may comprise access points or relay points and the nodes 104 may comprise access terminals. In a typical implementation the access points 102 provide connectivity for a network (e.g., a Wi-Fi network, a cellular network, a WiMax network, a wide area network such as the Internet, and so on). A relay point 102 may provide connectivity to another relay point or to an access point. For example, when an access terminal (e.g., access terminal 104A) is within a coverage area of a relay point (e.g., relay point 102A) or an access point (e.g., access point 102B), the access terminal 104A may thereby communicate with another device of the system 100 or some other network that is coupled to communicate with the system 100. As shown in FIG. 1, an access point (e.g., node 102B) may be coupled to another network (e.g., a wide area network such as the Internet 108) via a wired link 110 to provide connectivity to that network.

In some aspects two or more nodes of the system 100 may associate with one another to form a cluster of nodes (e.g., independent service sets). For example, the nodes 102A, 102B, 104A, and 104B may form one cluster while the nodes 102C, 102D, and 104C may form another cluster. Here, a cluster may comprise a sub-network including one or more access points (e.g., a mesh network) whereby each access terminal of the cluster is served by one of the access points. In some aspects, one of the access points (e.g., designated the root access point) may comprise a wired access point that provides connectivity for the cluster to another network or networks.

In some implementations the nodes of a given cluster may communicate through the use of dedicated communication timeslots. For example, FIG. 2 illustrates a simplified example of traffic flow associated with transmit timeslots and receive timeslots. Referring to FIG. 2A, in this example one flow of traffic is from a node A (e.g., node 104A in FIG. 1) to a node B (e.g., node 102A) and then to a node C (e.g., node 102B). Each of the nodes A, B, and C is allowed to transmit or to receive during certain timeslots. For example, referring to FIG. 2B, nodes A and C may transmit during odd numbered timeslots and node B may transmit during even numbered timeslots. Conversely, nodes A and C may receive during even numbered timeslots and node B may receive during odd numbered timeslots. As illustrated by the relative alignment of the timeslots of FIG. 2B, the timeslots for the nodes A, B, and C are synchronized.

The use of timeslots as described in FIG. 2B may provide increased spectral efficiency and reduce the amount of interference in a wireless system. For example, if the nodes that transmit during the same timeslot are spaced a sufficient distance apart they may be able to successfully transmit to their respective receiving nodes without causing undue interference at other receiving nodes.

Moreover, interference management techniques may be employed to further reduce the possibility of interference between nodes. As will be discussed in more detail below, the nodes in the system may transmit control indications that are used to reduce the amount of interference seen by a given node. For example, a receiving node that is experiencing interference when it is trying to receive data from a particular node may transmit a control indication requesting that other nodes refrain from transmitting or reduce their transmit power when the receiving node is receiving data (e.g., during one or more subsequent timeslots). To this end, nodes that have data to transmit may be configured to regularly monitor for such control indications and this is efficiently accomplished in a synchronous, time-slotted system.

In contrast to the intra-cluster synchronization discussed above, the nodes of a given cluster may not be synchronized to the nodes of another cluster. For example, in an unplanned wireless local area network deployment, each cluster may be established independently of the other clusters with the result that the timeslots for different clusters may not commence and end at the same time (i.e., the timeslots are asynchronous). When two clusters are relatively close to one another, however, a transmitting node of one cluster may interfere with one or more receiving nodes of the other cluster since there may be some overlap between the transmit timeslots of the transmitting node and the receive timeslots of the receiving node(s). In this case, due to the lack of synchronization between the different clusters, a timeslot interference avoidance mechanism as described above may not be effective since the relative timing of the timeslots of the different clusters may change over time or may not even be known.

The discussion that follows describes a scheme for synchronizing timing of asynchronous nodes. Here, a node of a first cluster may determine that a node of a second cluster interferes with data communication of one or more nodes of the first cluster. For example, an access point of the first cluster may determine that its communication or the communication of a node that it serves is being subjected to or may be subject to interference. In this case, the access point may attempt to synchronize the timing of the two clusters to manage interference between the clusters. For example, once the clusters are synchronized, the access point of the first cluster may send a message to the interfering node of the second cluster to limit the interfering node's transmission during one or more subsequent timeslots.

In some aspects the nodes may be configured to repeatedly transmit timing reference signals to facilitate such synchronization. For example, a node of a given cluster may periodically transmit a timing reference signal that indicates the timing of the timeslots of that cluster. Thus, any neighboring cluster that receives this timing reference signal may synchronize its timeslots with the timeslots of the other cluster.

In some aspects a priority indication may be transmitted in conjunction with the timing reference signals. Such a priority indication may be used, for example, to ensure that each cluster in the system synchronizes to the best available source of timing. As an example, a first cluster may receive timing reference signals from a node in a second cluster whose timing is based on a GPS timing reference and also receive timing reference signals from a third cluster whose timing is based on a timing reference that is not as stable as the GPS timing reference. By associating a priority indication with each of these timing reference signals, the first cluster may readily determine that it should synchronize with the timing reference signals from the second cluster.

In the examples that follow, such a priority indication may take the form of a synchronization metric. Here, the synchronization metric may include information relating to, for example, the quality of a timing source as well is other information that may be used to prioritize the timing source. It should be appreciated that the following examples are provided for illustration purposes and that timing information (e.g., a message comprising timing reference signals and priority information) may be implemented in various ways in accordance with the teachings herein.

Figure 3:
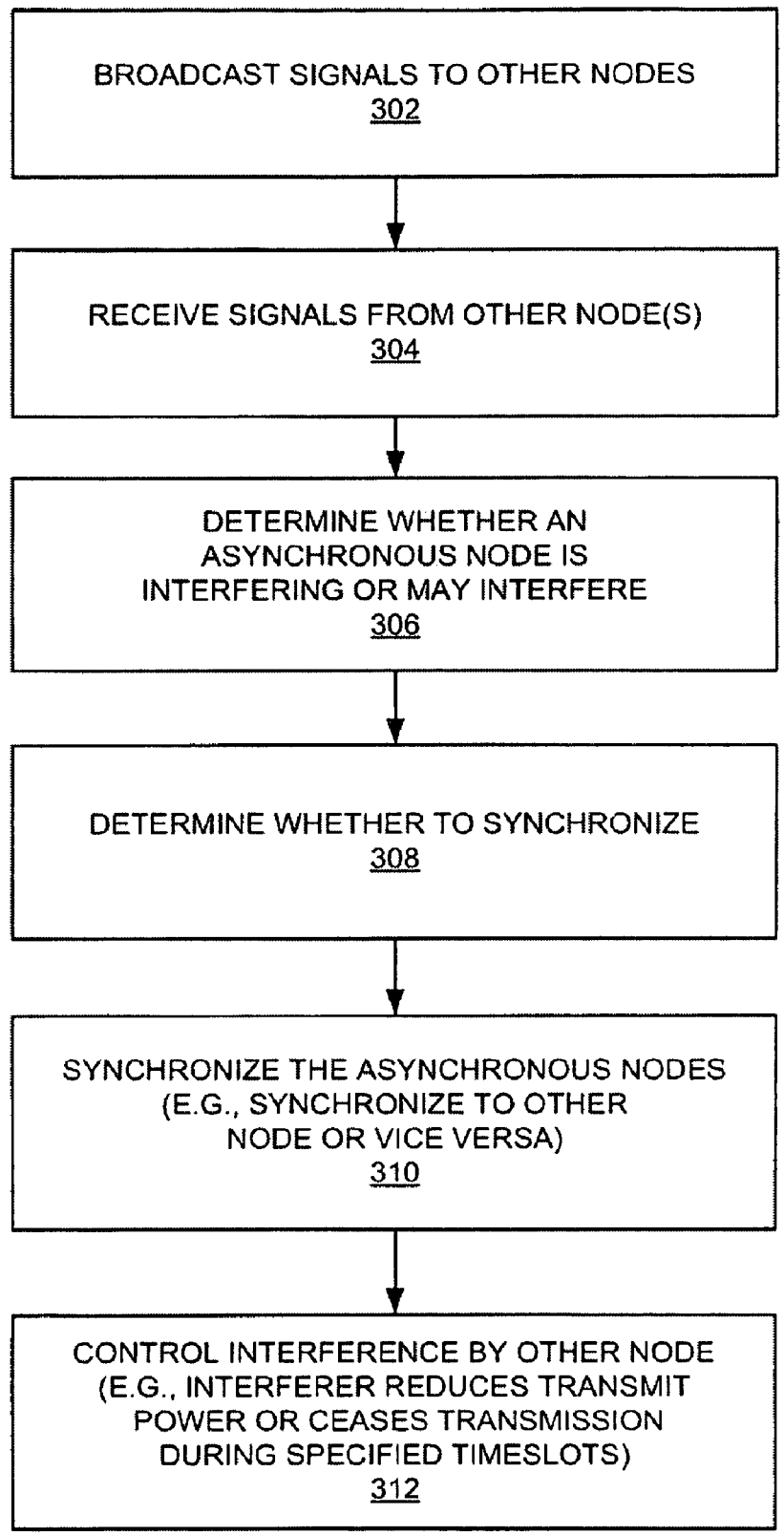
FIG. 3 is a simplified flowchart of several sample aspects of operations that may be performed to control interference.
Figure 4:
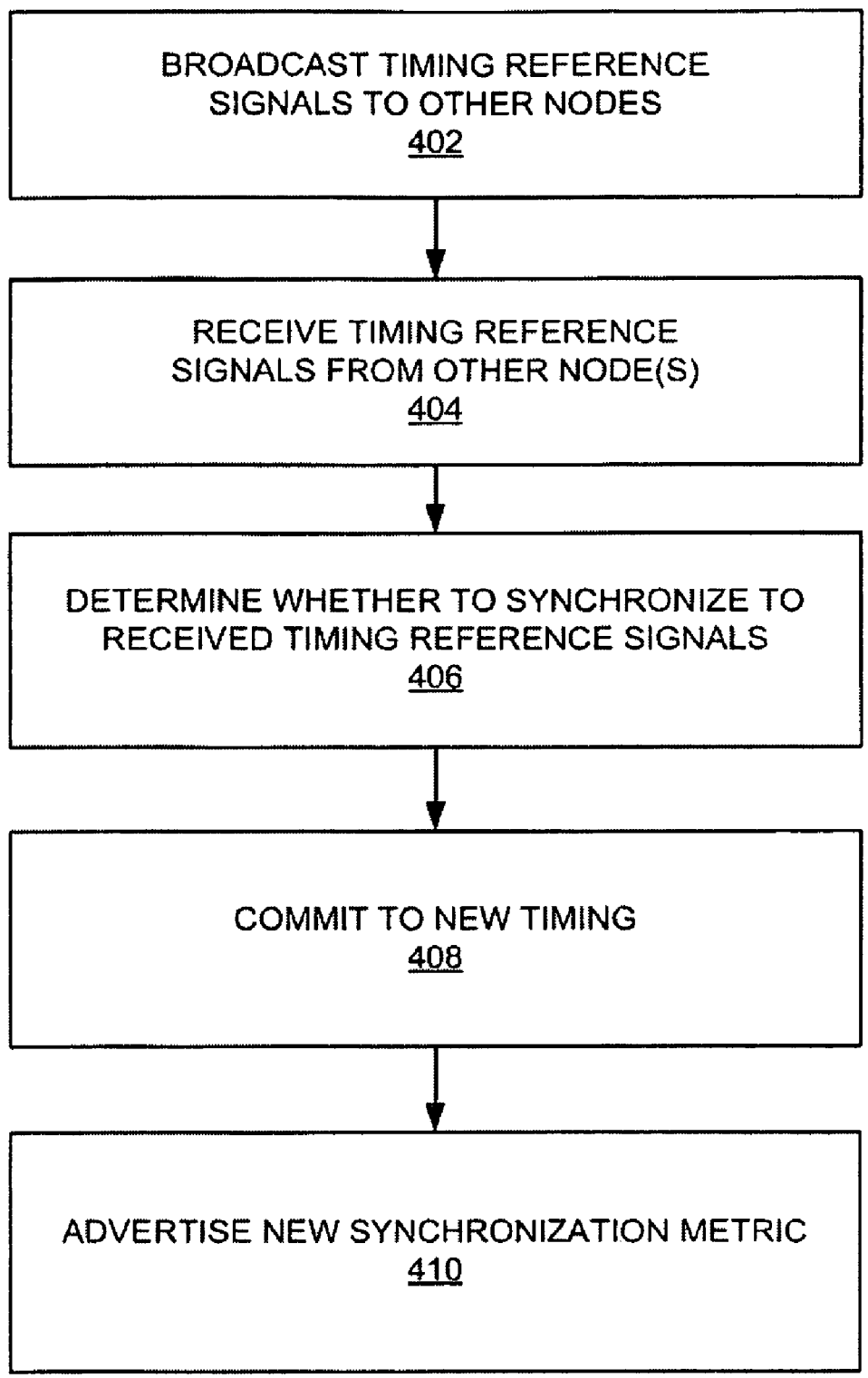
FIG. 4 is a simplified flowchart of several sample aspects of synchronization operations that may be performed in accordance with the teachings herein.
Figure 5:
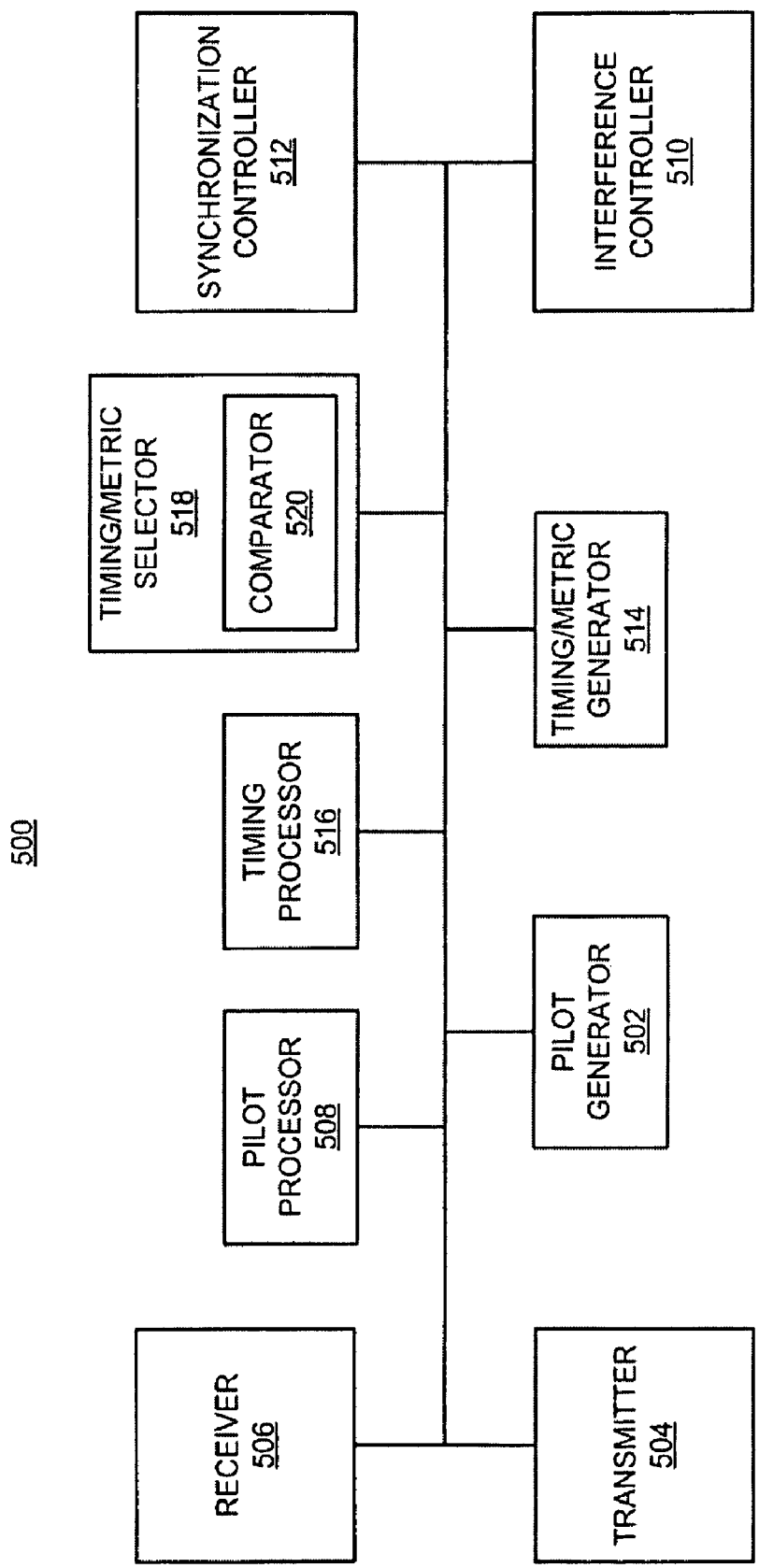
FIG. 5 is a simplified block diagram of several sample aspects of a wireless node.

With the above overview in mind, additional aspects relating to synchronizing nodes will be treated in more detail in conjunction with FIGS. 3, 4, and 5. The flowchart of FIG. 3 illustrates an example of operations that may be performed to determine whether to synchronize the timing of wireless nodes. The flowchart of FIG. 4 illustrates an example of operations that may be performed to synchronize the timing of wireless nodes. FIG. 5 illustrates several sample components of a wireless node 500 (e.g., an access point) that may be employed to provide functionality relating to synchronization operations. For convenience, the operations of FIGS. 3 and 4 (or any other operations discussed or taught herein) may be described as being performed by specific components (e.g., the components of FIG. 5). It should be appreciated, however, that these operations may be performed by other types of components and may be performed using a different number of components. It also should be appreciated that one or more of the operations described herein may not be employed in a given implementation.

Referring initially to FIG. 3, as represented by the block 302, each wireless node (e.g., node 500) in a system may broadcast various signals in conjunction with establishing or maintaining communication between nodes. For example, a node may broadcast synchronization channel signals and pilot signals (e.g., channel reference signals) that may be used by other nodes for synchronization and related purposes. To this end, the node 500 may comprise a pilot generator 502 that is configured to repeatedly generate a pilot signal. For example, the pilot generator 502 may generate a pilot signal on a periodic basis (e.g., every 100 milliseconds). In some implementations a pilot signal may comprise an acquisition signal (e.g., a broadband pilot) that other wireless nodes may utilize to quickly acquire the timing of the node that generated the pilot signal. In some implementations, a transmitter 504 of the node 500 may transmit each pilot signal at a specified power level (e.g., a defined power spectral density) that may be used to determine the power level at which the node 500 will transmit during normal data communication.

As represented by block 304, the wireless node 500 includes a receiver 506 for receiving the pilot and any other timing reference signals. In the example of FIG. 5, the node 500 includes a pilot processor 508 that cooperates with the receiver 506 to monitor for pilot and other signals transmitted by other nodes in the system. For example, a first node that does not belong to a cluster may initially detect a synchronization signal generated by a second node of the cluster and lock onto that signal. The first node may then look for the corresponding pilot signal to complete the synchronization process.

By monitoring these or other signals, a node may determine whether it is receiving or may receive interfering transmissions from an asynchronous neighboring node (block 306). Referring briefly to FIG. 1, in some cases a node (e.g., node 104B) of one cluster may be close enough to a node (e.g., node 102C) of another cluster to receive transmissions from the other cluster (e.g., as represented by the dashed symbol 106A). As mentioned above, the timeslots of the clusters may be not be synchronized. Accordingly, a node of the first cluster may include an interference controller 510 that is configured to determine whether a node of a neighboring asynchronous cluster is interfering with or may interfere with communication at the first cluster. In some aspects this determination may be based on detection of a relatively high level of interference on data as indicated, for example, by failed packets or by received power levels that are too high.

In some aspects an interference determination may be based on analysis by the pilot processor 508 of any pilot signals that are received from a node of the neighboring cluster. For example, the interference controller 510 may determine whether there is a likelihood of any significant interference based on signal strength of any pilot signals received from the asynchronous node. In addition, in implementations where the pilot signal provides information regarding the transmissions by the asynchronous node, the interference controller 510 may make its interference determination based on characteristics of the transmission (i.e., the type of interferer) as identified by the pilot processor 508. Here, identification of the interferer (or an attribute of the interferer that implicitly conveys its identity, such as a PN sequence) also may be acquired by processing the pilot signal.

As will be discussed in more detail below, a given node may identify a potential interferer based on signals received and decoded by that node or based on signals received and decoded by another node. As an example of the former case, an access point (e.g., node 102A in FIG. 1) may receive pilot signals directly from an asynchronous neighbor node (e.g., node 102C) as represented by the dashed symbol 106B. In this case, the access point may determine whether the asynchronous node is interfering with reception at the access point.

As an example of the latter case mentioned above, another node such a relay node or an access terminal (e.g., node 104B in FIG. 1) may receive pilot or other timing reference signals from an asynchronous neighbor node (e.g., node 102C). The access terminal or relay node may then send information regarding the received pilot or other signals to the access point (e.g., node 102A) that serves the access terminal or the relay node. The access point thus determines whether an asynchronous node is interfering with any of the nodes associated with the access point based on analysis of information that is received in an indirect manner.

As represented by block 308 of FIG. 3, a synchronization controller 512 of a node may determine whether the two clusters should be synchronized. Here, a decision to synchronize the clusters may be based on the degree to which transmission by a node of one cluster interferes with reception at a node of another cluster.

As represented by block 310, the synchronization controller 512 may then take appropriate action to synchronize the two clusters. As will be discussed in more detail below, this operation may involve determining which cluster has the higher priority timing, and causing the cluster with the lower priority timing to synchronize to the higher priority timing of the other cluster. Thus, in some aspects the synchronization controller 512 may invoke operations to cause the node 500 to synchronize to a timing source (e.g., the timing of another node). In addition, the synchronization controller 512 may cooperate with another node to cause that node to synchronize to the timing of the node 500.

As represented by block 312, once the different clusters are synchronized, in some implementations some of the nodes of the different clusters may cooperate to reduce interference between the nodes. For example, the interference controller 510 of a node may send a message (e.g., directly or via one or more nodes) to an interference controller of an interfering node requesting that the interfering node limit its transmission during one or more upcoming timeslots. Here, limiting transmission may include, for example, abstaining from transmitting during a timeslot (e.g., delaying data transmission), reducing transmit power during a timeslot, reducing data transmission rate during a timeslot, or performing or abstaining from performing some other related operation. Interference mitigation techniques such as these are further discussed in United States Patent Application Publication No. 2007/0105574, the disclosure of which is hereby incorporated by reference herein.

In some implementations interference control messages may be transmitted from one node to another node via the wireless communication medium (e.g., via a given wireless channel). Here, a specific period of time within certain timeslots may be designated for the transmission of a control indication. In this case, nodes that have data to transmit may scan for control indications at the designated period of time during a timeslot to determine whether any receiving nodes are requesting transmitting nodes to limit their transmissions. In some implementations this method of interference avoidance may be employed across a cluster or clusters. That is, any node in a given cluster may monitor for control indications at the designated times to readily determine whether there are any associated or non-associated receiving nodes that are requesting the transmitting nodes to limit their transmissions.

Additional details relating to a sample synchronization method are set forth in FIG. 4. In the described method, nodes (e.g., access points) in a system may be configured to perform self-synchronization. For example, a given access point may unilaterally determine whether and when to synchronize to a given timing source (e.g., by synchronizing to timing reference signals provided by another access point). In general, the synchronization techniques of FIG. 4, as well as the other synchronization techniques taught herein, may be performed independently of the other operations discussed herein (e.g., interference control). Also, for illustration purposes, synchronization techniques may be described herein in the context of a slotted system. It should be appreciated, however, that these teachings may be applicable to non-slotted systems as well.

As represented by block 402 of FIG. 4, each node in a system may comprise a timing/metric generator 514 (FIG. 5) that is configured to repeatedly generate a timing reference signal. For example, the timing metric generator 514 may generate a timing reference signal on a periodic basis (e.g., every 1 second).

In some aspects, a timing reference indicates a particular time within a timeslot (e.g., the beginning or the end of the timeslot). For example, the transmission time of a timing reference signal may coincide with the beginning of a timeslot for the node.

In some aspects, a synchronization metric may be associated with each of the above timing references. This synchronization metric may be based on the current state of the node and/or other synchronization metrics heard by the node. As discussed herein, a synchronization metric may define the priority that is used by a node to select one timing reference for synchronization in the event the node receives multiple timing references associated with different timing sources.

In some aspects a node may advertise a synchronization metric in conjunction with its advertised timing reference signals. For example, in some implementations a synchronization metric and associated timing reference signals comprise a common set of signals. Here, the timing of a defined portion (e.g., the beginning or end) of a synchronization metric message may comprise a timing reference that indicates a particular time within a timeslot (e.g., the beginning or the end of the timeslot).

In other implementations a synchronization metric message and associated timing reference signals may be transmitted independently of one another. For example, the transmission of a timing reference signal may precede or follow the transmission of a synchronization message.

A synchronization metric may be defined in a manner that facilitates recovering from certain error conditions. For example, access points may define the parameters of their synchronization metrics in a manner that prevents timing cycles that may otherwise occur when the access points are self-synchronizing. In addition, provisions may be made to allow for recovery from a collision situation whereby two or more access points choose the same synchronization metric but have different timings (e.g., different timing sources). Also, provisions may be made to enable recovery when there is a failure of an access point to which another access point was previously synchronized. An example of a synchronization metric is set forth in Table 1.

TABLE 1

| FIELD | SIZE |
|---|---|
| TYPE | 3 |
| SEQUENCE | 6 |
| RANDOM NUMBER | 10 |
| HOP COUNT | 5 |

In Table 1 the type field may be defined to favor certain types of timing sources over other types of timing sources. As an example, a type field designated "GPS" may indicate that the synchronization metric is associated with a GPS timing source. A type field designated "Wired-AP" may indicate that the synchronization metric is associated with a timing source that is, in turn, associated with a wired access point. For example, this timing source may derive its timing from timing signals received via a wired network connection. A type field designated "Fixed" may indicate that the synchronization metric is associated with a timing source that is, in turn, associated with (e.g., located within) a fixed (e.g., relatively stationary) access point. A type field designated "Mobile" may indicate that the synchronization metric is associated with a timing source that is, in turn, associated with a mobile (e.g., relatively portable) access point.

In some implementations a type field designated "Off-GPS" may indicate that the synchronization metric is associated with a timing source that derived from a GPS timing source, where the quality of the timing may be somewhat degraded. For example, the associated timing source may be synchronized to a GPS timing source via more than three node hops. The "Off-GPS" type field may not be used, however, in the event a "hop count" field (discussed below) is employed. In such a case, the combination of type=GPS and the hop count value may provide information that is effectively equivalent to the "Off-GPS" type field.

The above types may be ranked in a certain priority (e.g., in a descending priority order as set forth above). In some aspects, the priority may relate to the quality of a respective timing source (e.g., the quality of a clock source at an associated node).

The sequence field of Table 1 may relate to a sequence number that is adjusted under certain conditions. For example, in some implementations the sequence number is incremented each time an access point detects a collision (discussed in more detail below) or each time an access point loses its timing source (e.g., as a result of a failure of an access point from which timing is currently being obtained).

The random number field of Table 1 may relate to a random value (e.g., a codeword value picked within a defined range) that is generated under certain conditions. For example, in some implementations this field contains a random number that is generated each time the sequence number discussed above is incremented. The space provided for this number may be selected to be large enough to avoid collisions that may occur when a network is deployed incrementally such that the access points that are bought into service establish their own synchronization metrics.

The hop count field of Table 1 may relate to a hop count to a timing source associated with the synchronization metric. For example, a hop count of two may be defined for the case where the node that generates the synchronization metric acquires its timing from another node that, in turn, acquires its timing from yet another node.

In some implementations the hop count may be used as an indirect measure of the size of a cluster. That is, a large hop count may indicate that the cluster is relatively large. In some cases, an estimate of the size of a cluster may be used as a synchronization parameter whereby timing associated with a larger cluster may have a higher priority than timing associated with a smaller cluster.

It should be appreciated that the fields described above are merely illustrative of some of the types of information that a synchronization metric may define, and that other types of synchronization-related information may be utilized in other implementations depending on the requirements of those implementations. For example, some implementation may utilize a unique value (e.g., a media access control address) instead of a random number.

In some implementations the range of synchronization-related signals generated by a given node may be greater than the range of normal data communications signals generated by that node. As an example, in some implementations a range for a synchronization metric of a node as discussed herein may be two or three times the data edge range for that node.

Figure 6:
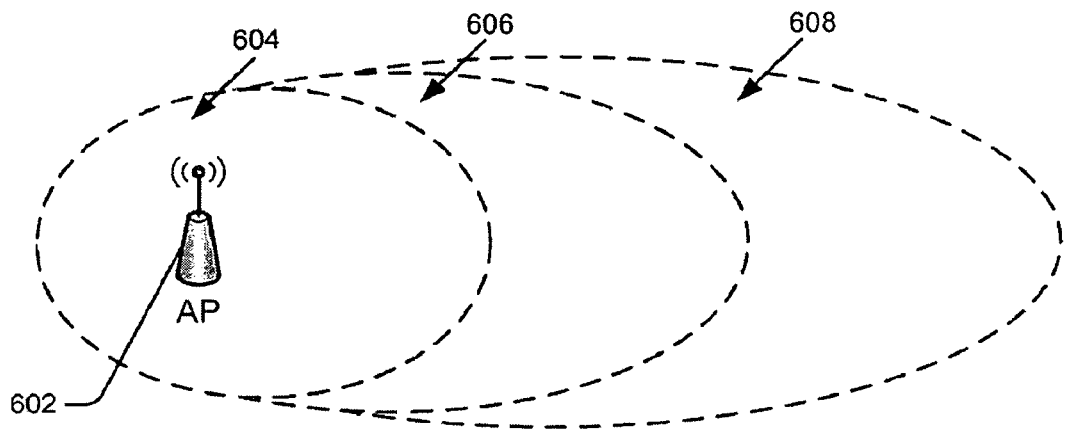
FIG. 6 is a simplified diagram of several sample aspects of communication regions.

FIG. 6 illustrates an example of different communication ranges that may be employed in a given system. The area 604 represents a communication region within which another node may receive signals (e.g., data and control) from the node 602 (e.g., an access point). The region 606 represents a fine timing region where another node may receive an acquisition pilot signal and a synchronization metric signal from the node 602. In some implementations a node in this region may be able to synchronize to the timing of the node 602 within a few chips (e.g., in less than 2 microseconds). The region 608 represents a coarse timing region where another node may only receive the synchronization metric from the node 602. In some implementations a node in this region may be able to synchronize to the timing of the node 602 within a half of an OFDM symbol (e.g., in less than 50 microseconds). From the diagram of FIG. 6 it may be observed that the range for synchronization-related signals may be substantially greater (e.g., two or three times greater) than the range of normal data communication signals.

In some implementations synchronization metric-related signals may be transmitted at a specified power level (e.g., a defined power spectral density). In this way, a receiving node may determine (e.g., estimate) the power level at which the node that transmitted these signal will transmit during normal data communication.

Referring again to FIG. 4, as represented by block 404, a node may include a timing processor 516 (FIG. 5) that is configured to monitor for timing reference signals (e.g., as provided by synchronization metric messages) transmitted by other nodes in the system. The node may thus determine the timeslot timing of its neighboring nodes by analyzing (e.g., determining the time of receipt of) the received timing reference signals. In addition, the node may determine the relative priority of the received timing reference signals by analyzing the associated synchronization metrics.

A node may acquire timing reference signals either directly or indirectly. As an example of the former case, the receiver 506 of the node 500 may receive timing information that was transmitted by a timing source or another access point that is within wireless range of the node 500. As a specific example, a given node may acquire a GPS-based timing reference either directly (e.g., via a GPS receiver at the node) or via timing reference signals received from another node. In the latter case, it may be assumed that a GPS-based timing reference that is received via a defined number of node hops (e.g., three hops or less) may be considered to be a reliable (e.g., stable) GPS-based timing reference. In some aspects the node 500 may acquire timing in substantially the same manner that an access terminal acquires timing during an acquisition procedure.

In some cases, a node such as an access point may indirectly receive timing reference signals via another node (e.g., via an attached access terminal or access point) that received the timing reference signals from a second access point. Here, the access terminal may receive the timing reference signals either directly from the second access point or via some other access terminal (e.g., an access terminal that was previously associated with the second access point) that receives the timing reference signals from the second access point. Additional details relating to indirect acquisition of timing signals are treated in more detail below in conjunction with FIGS. 12 and 13.

As represented by block 406 of FIG. 4, the synchronization controller 512 may cooperate with a timing/metric selector 518 to determine whether to synchronize to any of the received timing reference signals. As mentioned above, the node 500 may be configured to synchronize to one of a plurality of received timing references in accordance with a priority scheme. For example, in implementations where a satellite-based (e.g., GPS-based) timing source is designated as the highest priority (e.g., is the most stable) type of timing source, an access point may synchronize to these timing reference signals in the event they are available. If, on the other hand, the access point does not receive GPS-based timing reference signals, the access point may determine whether it is receiving any lower priority timing reference signals (e.g., from an Off-GPS source or a non-GPS source). In the event the access point is not receiving any timing references signals, the access point may simply define its own timing reference.

In some implementations the timing/metric selector 518 may comprise a comparator 520 that compares the received synchronization metrics to identify the synchronization metric having the highest priority. In some aspects, the comparison of synchronization metrics is performed on a field-by-field basis. For example, the comparator 520 may first compare the type fields of the synchronization metrics. In the event one of the type fields is of a higher priority (e.g., GPS) the synchronization controller 512 may elect to synchronize to the timing reference signals associated with that synchronization metric. In other words, the comparison may stop at this point whereby the remaining fields of the synchronization metrics are not considered. In contrast, if the type fields of the synchronization metrics are the same, the comparator 520 may then compare the entries of the next highest priority field (e.g., the sequence field) in an attempt to determine the higher priority synchronization metric. This procedure may then be repeated for subsequent fields until the higher priority synchronization metric is identified.

As discussed herein, various procedures may be invoked to avoid or compensate for error conditions that may be associated with the synchronization selection process. For example, in some aspects tiebreaking procedures may be implemented to deal with a situation where identical synchronization metrics are received.

In addition, as mentioned previously, the synchronization metrics may be defined to ensure that no cycles (e.g., race conditions) are created when a node synchronizes to another node. As an example, a cycle could potentially be created if a first access point chooses to synchronize to a second access point that, in turn, chooses to synchronize to the first access point. As a further example, a first access point may synchronize to a second access point, while the second access point synchronizes to a third access point that, in turn, synchronizes to the first access point.

Through the use of a priority scheme as taught herein, the above cycles may be avoided. For example, a given collection of nodes may comprise several sets of clusters, each of which includes at least one access point. Here, each cluster may be close enough to at least one other cluster to receive timing reference signals from that other cluster, or vice versa. In addition, based on the synchronization scheme described herein, all of the clusters in the collection may synchronize to a common timing reference.

By specifying a strict priority for synchronization as discussed herein, as long as a synchronization metric is advertised that is unique among the access points in the collection of nodes, the access points in the collection of nodes will eventually synchronize to the access point with the highest synchronization metric. Here, the access points may form a synchronization tree where the access point with the highest synchronization metric is the root of the synchronization tree.

Referring block 408 of FIG. 4, in the event a decision is made to synchronize to a new timing reference, the node performs various operations to commit to new timing. For example, in some aspects the synchronization controller 512 may cause the timing of the node to track the timing of the selected timing reference. In some aspects, the nodes may synchronize at a timeslot level. In other words, a given node may monitor received timing reference signals to determine when to start and end its timeslots in order to maintain synchronization with the timeslots of another node. Advantageously, by synchronizing at the timeslot level, the nodes may not need to maintain extremely precise synchronization between their respective master clocks (e.g., the nodes' highest speed clocks), thereby simplifying the process of achieving and maintaining synchronization.

As represented by block 410, once the node 500 commits to the new timing, the node 500 advertises the new synchronization metric and the associated timing reference. Thus, as discussed above the timing/metric generator 514 may generate the appropriate signals that are then transmitted by the transmitter 504 to the neighboring nodes in the system. In this way, other asynchronous nodes in the system may elect to synchronize to the timing of the node 500, if desired.

As will be discussed in more detail below, the synchronization controller 512 also may cooperate with other nodes that have been previously associated with the node 500 so that all of these nodes remain synchronize. For example, an access point may send appropriate messages (e.g., beacons) to its attached access terminals wherein the messages indicate that the timeslot timing for that cluster (e.g., a service set) is being or will be changed.

Synchronization operations as taught herein may be invoked in various ways. For example, as discussed above, in some implementations synchronization may be invoked upon detection of an asynchronous interferer or potential interferer. In addition, in some implementations synchronization operations may involve repeatedly monitoring for the best-available timing source and synchronizing a cluster to the currently best-available timing source.

Figure 7:
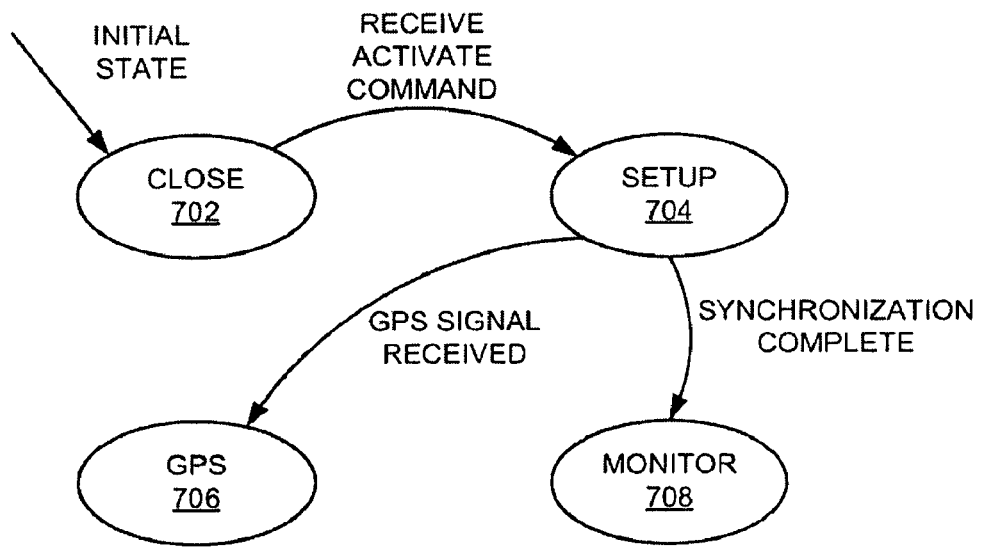
FIG. 7 is a simplified state diagram of several sample aspects of states that may be employed to synchronize wireless nodes.

Referring now to FIGS. 7-11, sample operations that may be employed to synchronize to the best-available timing source will be described in the context of an access point that monitors for timing signals from other access points and makes synchronization decisions based on the results of the monitoring. FIG. 7 illustrates several sample synchronization states that may be utilized by the access point. FIGS. 8-11 describe sample operations that may be employed at each of the states of FIG. 7. For convenience, the operations of FIGS. 7-11 may be described as being performed by components of the node 500. It should be appreciated, however, that these operations may be performed in various ways by various types of components based on the teachings herein.

Referring initially to FIG. 7, the initial state for a node for purposes of synchronization may comprise a close state 702. At this state, the node waits for a command authorizing activation of the receiver (e.g., receiver 506) for the synchronization process.

Upon receipt of a receive activate command (e.g., when the node is powered on), the node transitions to a setup state 704. Here, the node establishes the initial timing synchronization for the node based on either satellite-based timing or non-satellite-based timing. For convenience, the discussion that follows will refer to GPS-based timing. It should be appreciated, however, that the associated teachings may be equally applicable to other types of satellite-based timing.

In the event a GPS signal is received by the node (e.g., via GPS signals from a satellite or timing reference signals from a GPS-enabled node), the node enters a GPS state 706. Here, the node synchronizes to the GPS timing source and advertises a synchronization metric indicative of this GPS timing. The node remains in the GPS state as long as it receives the GPS signal.

In the event a GPS signal is not received by the node at the setup state 704, the node determines where it should get its initial timing, synchronizes to that timing, then enters a monitor state 708. At the monitor state 708, the node monitors for higher priority synchronization metrics, collisions, and target access point failure, and either maintains or adjusts its synchronization based on the results of this monitoring. In addition, in the event the node does not receive timing reference signals at either state 704 or 708, the node may define and advertise its own synchronization metric.

A deactivate command may be employed to transition the node from any of states 704, 706, and 708 back to the close state 702. Such command may be invoked, for example, in the event the radio of the node is deactivated (e.g., when the node is powered off).

The above operations may thus involve a node determining whether a timing reference is being received, and defining and advertising a synchronization metric based on this determination. In other words, if a timing reference (e.g., a signal from a satellite or a signal associated with a synchronization metric) is received, the node may synchronize to the received signal. On the other hand, if a timing reference is not received, the node may define a synchronization metric and transmit that synchronization metric to its neighboring nodes.

Figure 8:
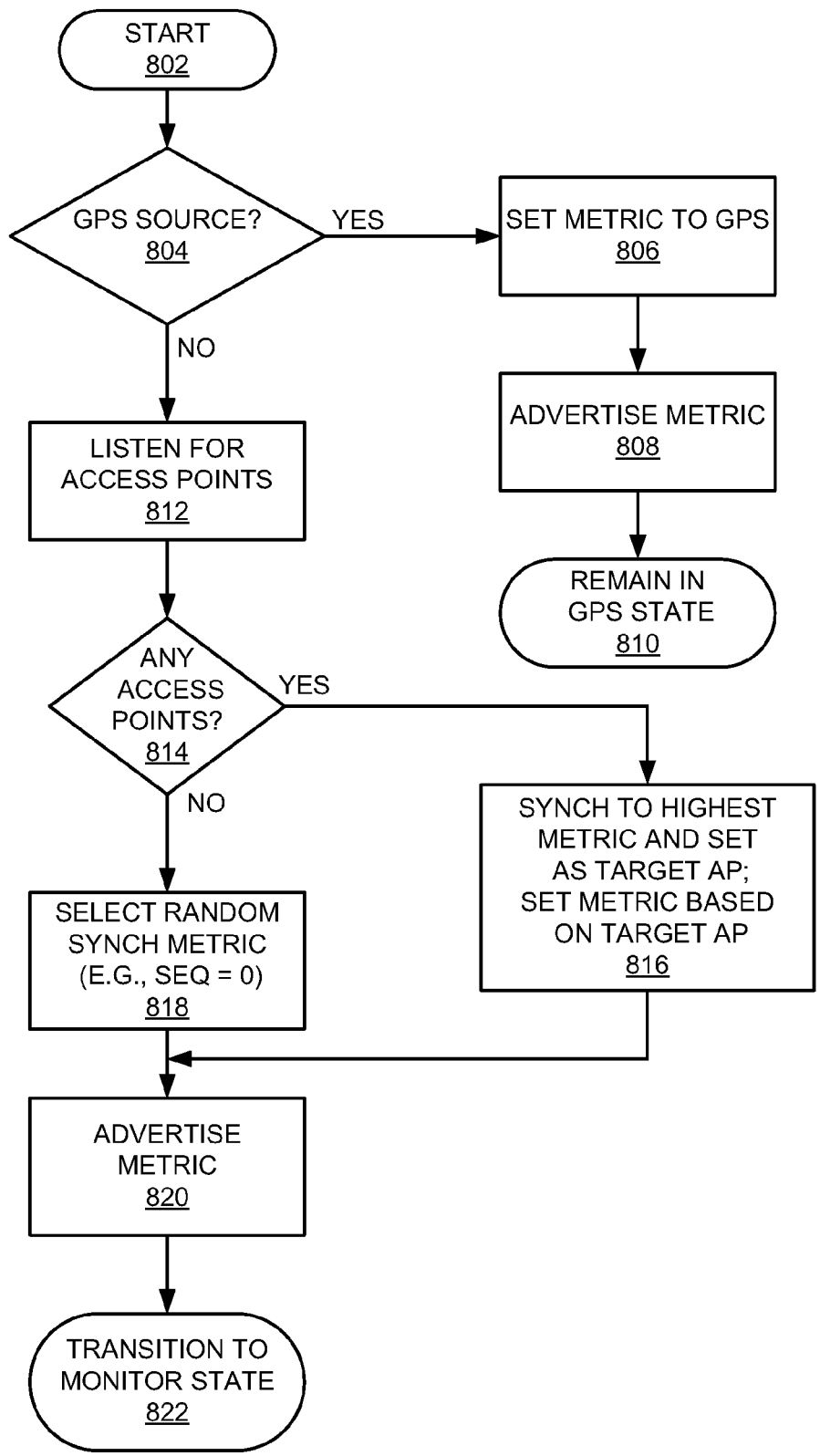
FIG. 8 is a simplified flowchart of several sample aspects of operations that may be performed in conjunction with a synchronization setup state.
Figure 9:
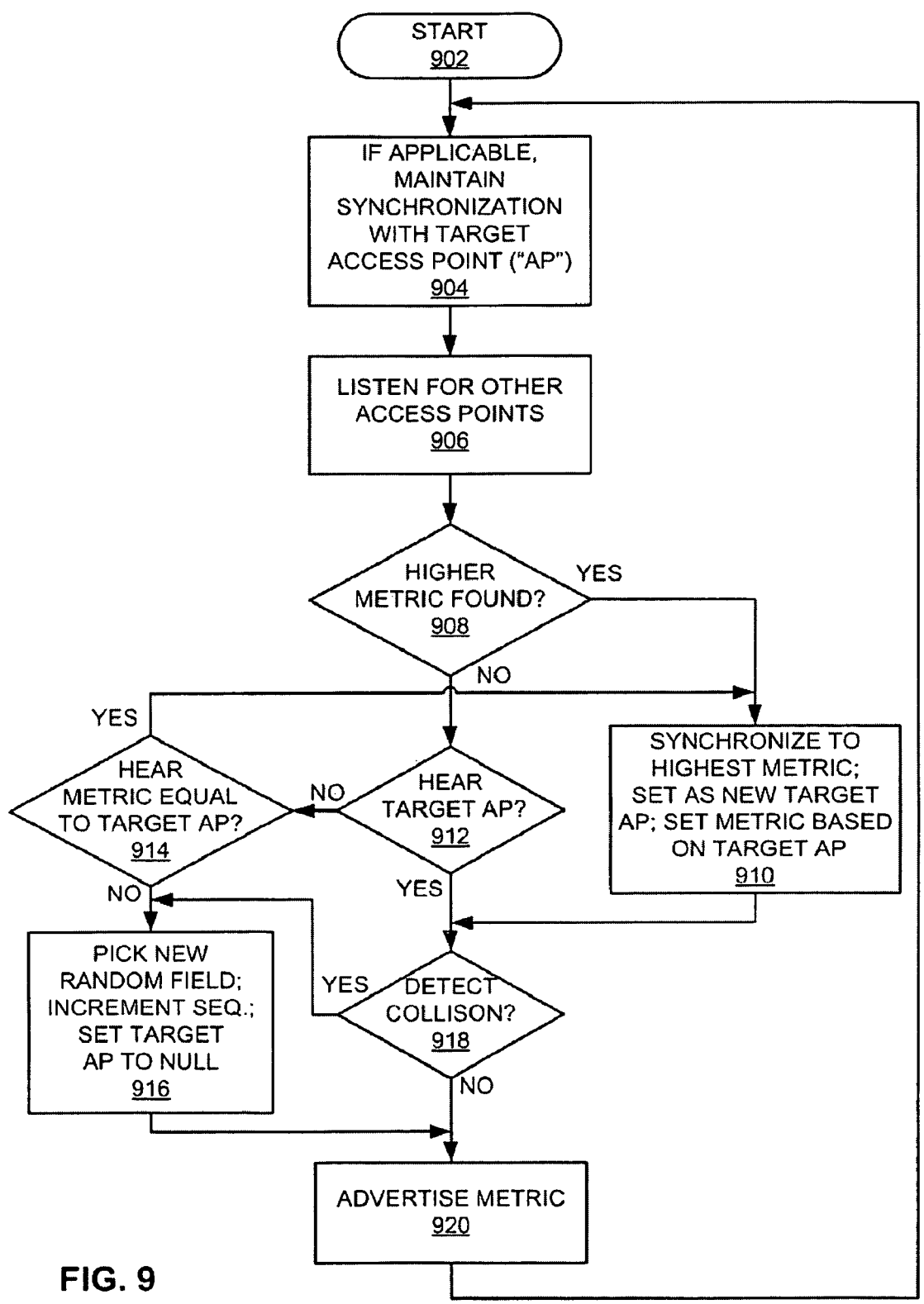
FIG. 9 is a simplified flowchart of several sample aspects of operations that may be performed in conjunction with a synchronization monitor state.

Sample operations relating to states 704, 706, and 708 will now be described in more detail in conjunction with FIGS. 8-11. FIG. 8 illustrates several sample synchronization setup state operations. FIG. 9 illustrates several sample synchronization monitor state operations. FIG. 10 illustrates sample synchronization timing associated with a failure of a timing source. FIG. 11 illustrates sample synchronization timing associated with a synchronization metric collision.

Referring initially to FIG. 8, in this example the operation of the synchronization setup state commences at block 802. Briefly, in this state the node synchronizes to a GPS-based timing reference if one is available. If the GPS-based timing reference is not available, the node synchronizes to the highest priority synchronization metric it receives. If no synchronization metrics are received, the node defines its own synchronization metric.

At block 804 the node (e.g., timing processor 516) determines whether there is a GPS timing source available. In some cases the GPS timing source may be local. For example, the node may include a GPS receiver and may be located in an area where GPS signals are accurately received. In some cases the node may directly receive GPS-based timing reference signals from a node (e.g., an access point) that has a local GPS timing source. In other cases the node may receive signals that are derived from GPS signals. For example, the node may receive timing reference signals from an access terminal that, in turn, receives timing reference signals from a node that has a local GPS timing source. In some cases a GPS-based timing reference may be acquired via a cellular connection.

In the event a GPS timing source is available, the operation proceeds to the GPS state as represented by blocks 806-810. Thus, at block 806 the timing/metric generator 514 sets the node's current synchronization metric to the GPS-based timing source (e.g., sets the type field to "GPS") and the synchronization controller 512 synchronizes the node's timeslot timing to this GPS-based timing source.

Here, in the event the node's GPS timing is derived timing, the synchronization metric may include an indication relating to the relative distance to the GPS timing source. For example, as mentioned above in some implementations the synchronization metric may indicate the number of hops (e.g., node hops) from the current node to the access point that provides the GPS-based timing source. In some implementations advertisement of the number of hops may be restricted to prevent a node from advertising a GPS-based timing reference that is based on a relatively distant GPS-based timing source. For example, in some synchronization schemes a synchronization metric may be defined as being associated with a GPS-based timing source only if the number of hops is three or less. In this way, in an area where there are relatively few GPS receivers, the propagation distance of GPS timing may be limited so that collisions that may otherwise result from propagation delays may be avoided.

At block 808, the timing/metric generator 514 cooperates with the transmitter 504 to advertise the synchronization metric. For example, as discussed herein the node 500 may transmit the synchronization metric in conjunction with timing reference signals to enable any asynchronous neighboring nodes to synchronize to this GPS-based metric, if desired.

As represented by block 810, the node may remain in the GPS state as long as the GPS timing source is available. Here, the node may continue to maintain synchronization with the GPS-based timing source and repeatedly (e.g., periodically) advertise the GPS-based synchronization metric.

In the event a GPS timing source was not available at block 804, the receiver 506 and the timing processor 516 may monitor the communication medium for synchronization-related signals from other access points or from attached nodes (block 812). If, at block 814, such signals are received from one or more neighboring access points (i.e., directly or indirectly) the operational flow proceeds to block 816. In this case, the node may synchronize to the highest priority synchronization metric that was received from the neighboring access point(s). Thus, a timing/metric selector 518 may compare competing synchronization metrics to identify the highest priority synchronization metric. The synchronization controller 512 may then designate the access point that provides the selected timing reference as the target access point ("target AP") for this node. In other words, the target access point designation identifies the access point that provides the timing source to which the node is currently synchronized.

In addition, the timing/metric generator 514 may define the current synchronization metric for the node based on the target access point. For example, if the target access point is a GPS timing reference, the node may set the type field for the synchronization metric to "Off-GPS" and set the sequence value to "0." On the other hand, if the target access point is not a GPS timing reference, the node may increment the hop count and use the previous synchronization metric values for the other fields.

If no synchronization-related signals were received from any access points at block 814, the node may establish its own timing. Accordingly, as represented by block 818 the timing/metric generator 514 may define a random synchronization metric. For example, the type field of the synchronization metric may indicate the type of the node (e.g., fixed, mobile, wired access point). In addition, the sequence field may be set to zero, while the random number field is set to a randomly generated number.

As represented by block 820, the node advertises the synchronization metric defined at either block 816 or block 818. The node may then transition to the monitor state at block 822.

FIG. 9 illustrates several sample operations that may be performed in conjunction with the monitor state, commencing at block 902. Briefly, in this state the node maintains synchronization with its target access point and monitors the communication medium for any newly advertised synchronization metrics that have a higher priority than the synchronization metric of the current target access point.

At block 904, the node maintains synchronization with the target access point if a target access point was previously designated. While maintaining synchronization, the node also listens for timing reference signals from any neighboring access points (block 906).

As represented by block 908, in conjunction with this monitoring, the node analyzes any received synchronization metrics to determine whether a higher priority synchronization metric is available. For example, the timing/metric selector 518 may compare the received synchronization metrics with one another and with the current synchronization metric for the node.

If a higher priority synchronization metric is found at block 908, the operational flow proceeds to block 910. In this case, the node may synchronize to the highest priority synchronization metric that was received from a neighboring access point. The synchronization controller 512 may thus designate the access point that provides the selected timing reference as the new target access point for this node. The timing/metric generator 514 may then define the current synchronization metric for the node based on the target access point.

If a higher priority synchronization metric was not found at block 908, the node verifies whether it is still receiving synchronization metric-related signals from its current target access point (block 912). If not, at block 914 the node may monitor the communication medium to determine whether it is receiving the same synchronization metric from another node. In other words, in the event a node is no longer receiving synchronization signals from its target access point due to a failure of the target access point or some other communication failure, the node may attempt to find a sibling or parent (i.e., in terms of the synchronization metric) of the target access point that advertises the same synchronization metric in conjunction with its timing reference signals. As an example, the sibling access point may derive its timing from the same timing source that the prior target access point used to derive its timing. In such a case, the two timing references are essentially identical. Thus, in the event a sibling access point is located, the operational flow proceeds to block 910 wherein the node may simply designate the sibling access point as the new target access point.

An example of how access points in a system may react to a failure to receive signals from a target access point is illustrated by the timing relationships shown in FIG. 10. FIG. 10A illustrates a scenario where an access point AP3 serves as a timing source for several other access points AP1, AP2, and AP4. For example, AP3 is the target access point for AP2 and AP4 as indicated by the arrows that represent that AP2 and AP4 look to AP3 for their timing. In addition, AP2 provides timing for AP1 as indicated by the illustrated arrow. Here, a random number Y is defined for the synchronization metric of AP3. Thus, the synchronization metric of every access point in FIG. 3 is based on the random number Y.

Figure 10A:
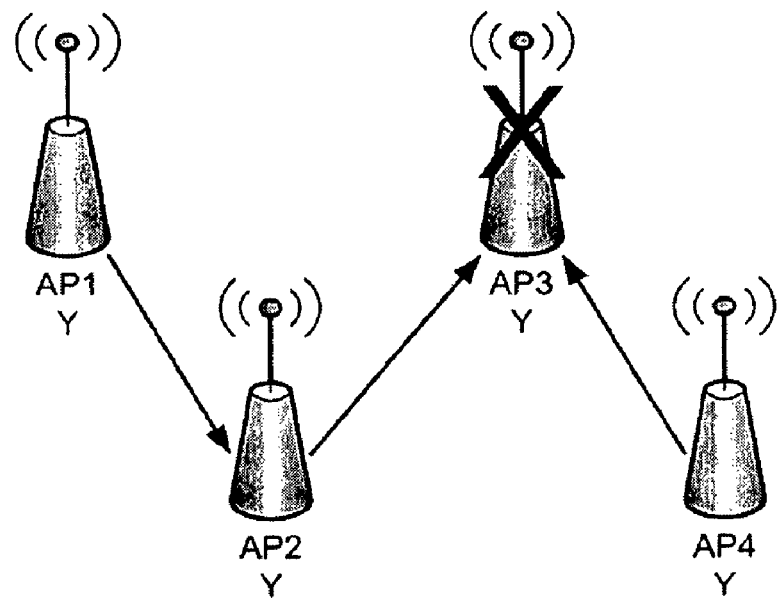
FIGS. 10A-10D, are simplified diagrams of several sample aspects of inter-node timing relating to a node failure or some other similar condition.

At some point in time, AP2 and AP4 no longer receive timing signals from AP3 (e.g., AP3 fails) as represented by the X drawn over AP3 in FIG. 10A. Once this failure associated with AP3 is detected, AP2 and AP4 independently generate new synchronization metrics. For example, AP2 and AP4 may each increment the sequence number in their respective sequence field and select a new random number for their respective random field. In the discussion that follows it is assumed that AP2 selected a random number X while AP 4 selected a random number Z.

Figure 10B:
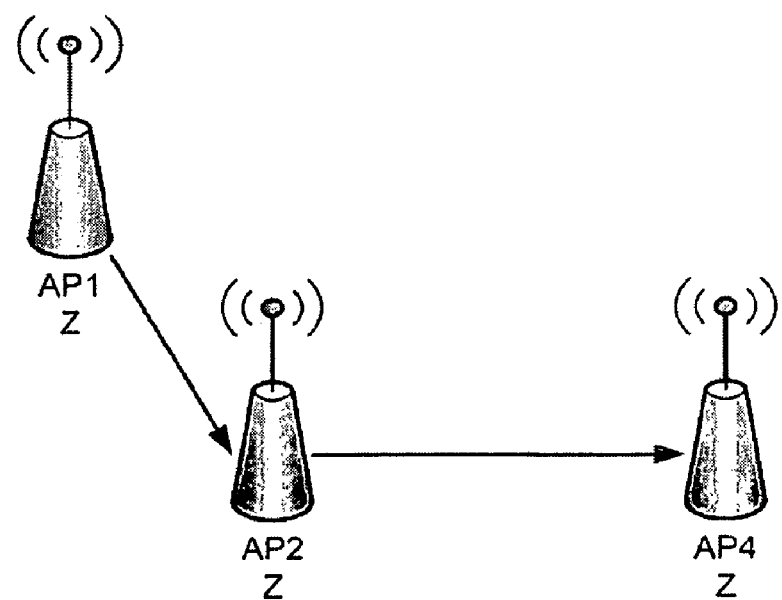

FIG. 10B illustrates the case where Z is greater than X. In this case AP4 advertises the higher priority synchronization metric. Consequently, AP2 synchronizes to AP4 (e.g., AP4 is the target access point for AP2). AP2 continues to provide the timing for AP1. Thus, all of the nodes of FIG. 10B are synchronized to timing associated with a synchronization metric having the random field number Z.

Figure 10C:
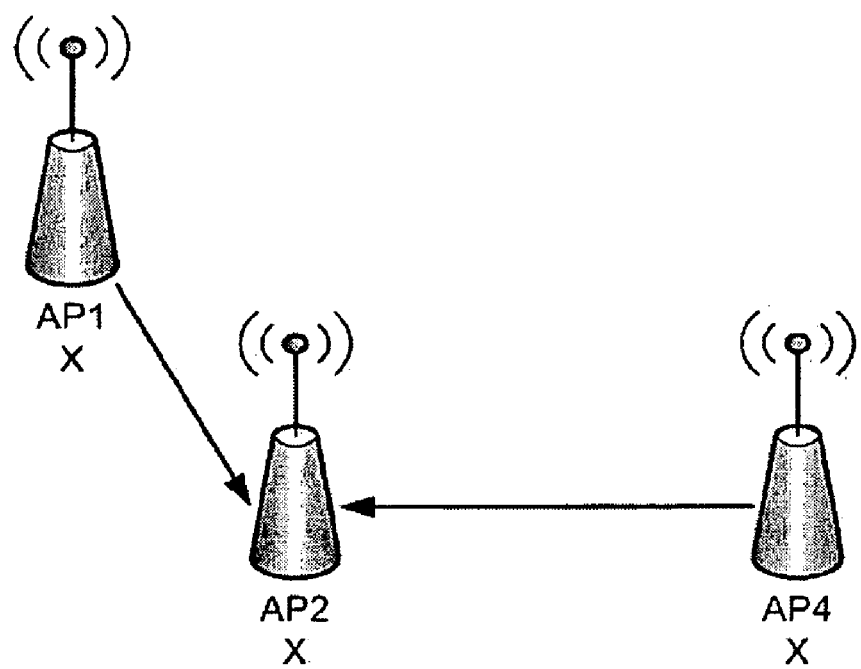

FIG. 10C illustrates the case where X is greater than Z. In this case AP2 advertises the higher priority synchronization metric. Consequently, AP4 synchronizes to AP2 (e.g., AP2 is the target access point for AP4). AP2 continues to provide the timing for AP1. Thus, in this case, all of the nodes of FIG. 10B are synchronized to timing associated with a synchronization metric having the random field number X.

Figure 10D:
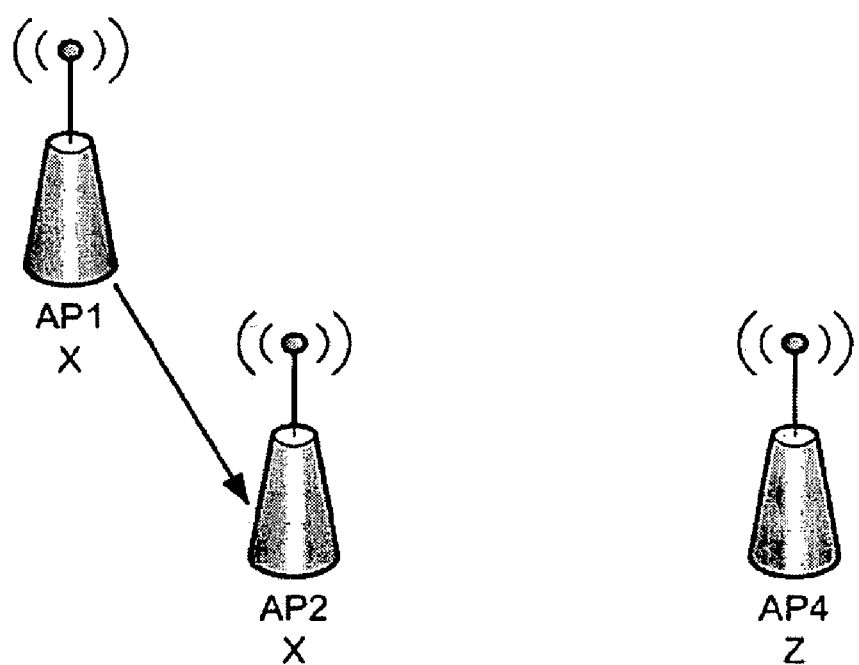

FIG. 10D illustrates the case where AP2 and AP4 are too far apart from one another to receive the synchronization-related signals transmitted by the other node. In this case, AP4 defines and advertises its own synchronization metric based on the random field number Z. In addition, AP2 defines and advertises its own synchronization metric based on the random field number X. AP2 continues to provide the timing for AP1. Consequently, AP1 and AP2 are synchronized to timing associated with a synchronization metric having the random field number X, while AP4 is synchronized to timing associated with a synchronization metric having a random field number Z.

Referring again to FIG. 9, in the event a sibling access point was not found at block 914, the operational flow proceeds to block 916. In this case, the node may define its own synchronization metric. For example, the fields of the synchronization metric may be defined as described above in conjunction with block 818. In addition, a target access point field may be set to NULL since there is no target access point for the node in this case.

In some aspects, the search for a sibling access point as described above may be employed in cases where there has been, for example, a failure of a target access point of a node that is in the middle of a timing tree. In this case, the node may try to find a sibling of the target access point at block 914 and synchronize to that synchronization metric (i.e., performing the operations of block 910), before resorting to the generation of a new synchronization metric having an incremented sequence value (i.e., before proceeding to block 916).

Referring again to block 912, if the node determines that it is still receiving synchronization metric-related signals from its current target access point, at block 918 the node may analyze the synchronization metrics it has received and their associated timing to determine whether there are any synchronization metric collisions (e.g., another node is advertising the same metric as the current target access point, but with a materially different timing reference). Here, a collision may relate to a condition where different access points are advertising identical synchronization metrics even though the access points have different timing (e.g., they rely on different timing sources or their clocks have drifted at different rates).

As represented by block 916, when the node detects a collision it generates a synchronization metric that has a higher priority than the synchronization metric advertised by the colliding access points. In this way, the colliding access points will eventually synchronize to the timing for the new synchronization metric. Consequently, the colliding access points will no longer advertise different timing. Here, the node defines the new synchronization metric by incrementing the sequence value of the sequence field and generating a new random number for the random field. Thus, as the new synchronization metric has a larger sequence value than the sequence value of the synchronization metric that was advertised by the colliding access points, the colliding access points will synchronize to the timing provided by the node. Furthermore, the new node may pick one of the colliding timing references as its timing reference, so that only one of the colliding nodes (and its children) may need to change timing.

Figure 11A:
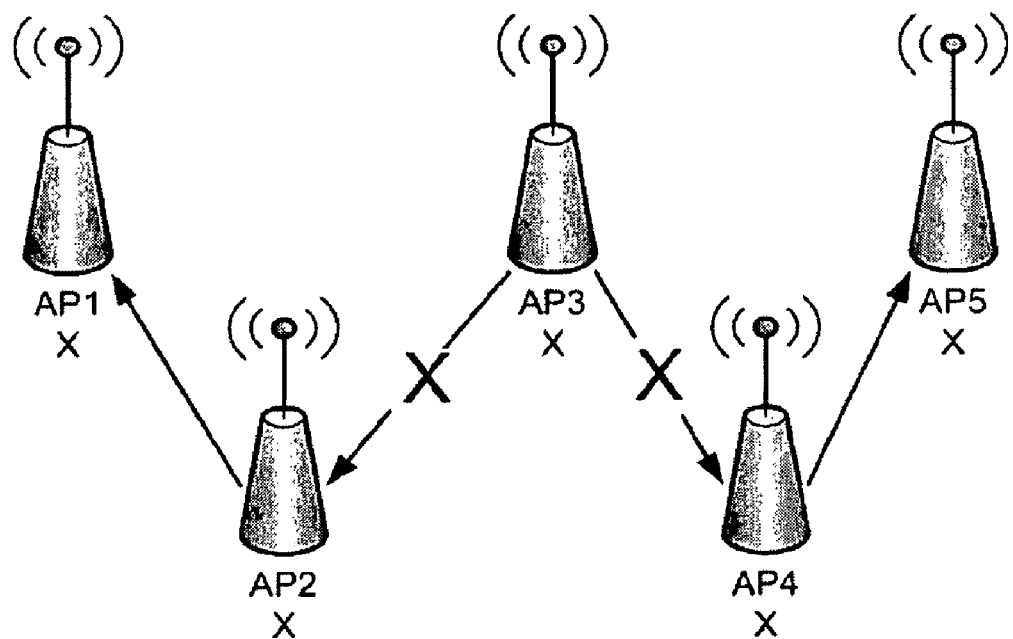
FIGS. 11A and 11B, are simplified diagrams of several sample aspects of inter-node timing relating to a collision.

An example of this collision avoidance scheme is illustrated by the timing relationships shown in FIG. 11. FIG. 11A illustrates a scenario where an access point AP3 determines that multiple access points AP2 and AP4 are advertising the same synchronization metric yet are associated with different timing. For example, AP2 may be advertising timing associated with one timing source AP1 while AP4 may be advertising timing associated with another timing source AP5. Here, through random coincidence, the same random number X has been defined by AP1 and AP5 for their respective synchronization metrics. Hence a collision condition exists.

As represented by the Xs through the timing arrows associated with AP3, AP3 does not synchronize with either AP2 or AP4. Instead, to resolve the collision, AP3 defines a new higher priority synchronization metric as discussed above.

Figure 11B:
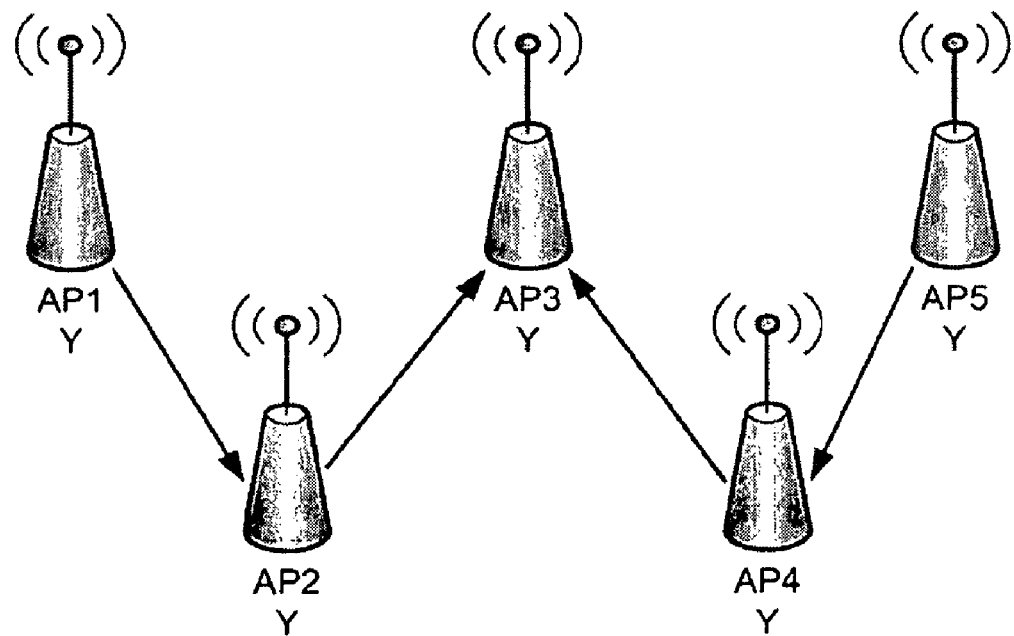

FIG. 11B illustrates timing relationships in the system after AP3 advertises its new synchronization metric. Access point AP3 now serves as the timing source for AP1, AP2, AP4, and AP5. For example, AP3 is the target access point for AP2 and AP4 as indicated by the arrows that represent that AP2 and AP4 look to AP3 for their timing. In addition, AP2 provides timing for AP1 and AP4 provides timing for AP5 as indicated by the illustrated arrows. Here, the newly selected random number "Y" is defined for the synchronization metric of AP3.

Referring again to FIG. 9, as represented by block 920, the node advertises the synchronization metric defined at either block 910 or block 916. Thus, the node may transmit its new synchronization metric and associated timing reference signals to thereby enable any asynchronous neighboring nodes to synchronize to this synchronization metric, if desired.

From the above it may be appreciated that in the event of a collision or target access point failure, nodes on the same synchronization tree may update their synchronization metric and maintain common timing. In addition, in the event a target access point fails, the timing tree structure may remain stable since the synchronization updates may percolate down the tree in order. Also, in the event of a collision, the timing tree structure may rearrange itself to orient to the node that detected the collision.

The collision avoidance scheme described herein may effectively handle a situation where multiple nodes concurrently detect the same collision or access point failure. In this case, although each node may generate a synchronization metric with the same sequence field, the random field may be defined in a manner such that there is a high probability that the random numbers will quickly resolve to a unique best metric. Consequently, even if the nodes happen to generate the same synchronization metric at some point, the process will repeat and resolve itself relatively quickly given that the nodes will independently select new random numbers. Moreover, as discussed above, in some cases (e.g., when another node is close enough to receive the identical synchronization metrics) the collision of the synchronization metrics generated by the nodes may be detected and resolved.

It should be appreciated that the illustrated order of the operational flow described herein is merely representative of a suitable order. Thus, many of the operations described herein may be invoked at various times and invoked in response to various criteria. For example, a node may perform, at various times, operations relating to determining whether a higher priority synchronization metric is available, relating to detection of a failed target access point, and relating to detection of a collision.

Figure 12:
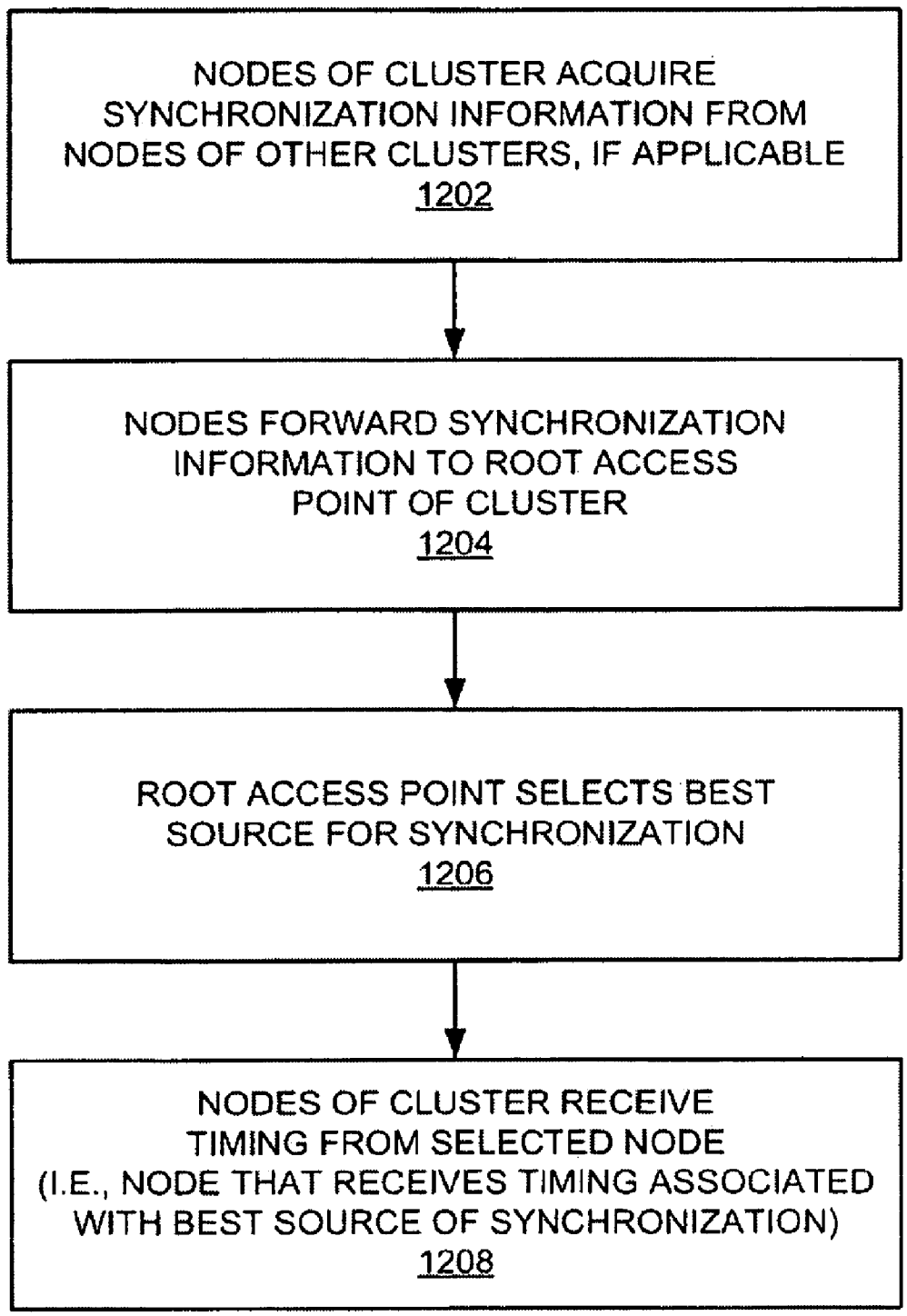
FIG. 12 is a simplified flowchart of several sample aspects of operations that may be performed in conjunction with intra-cluster synchronization.
Figure 13:
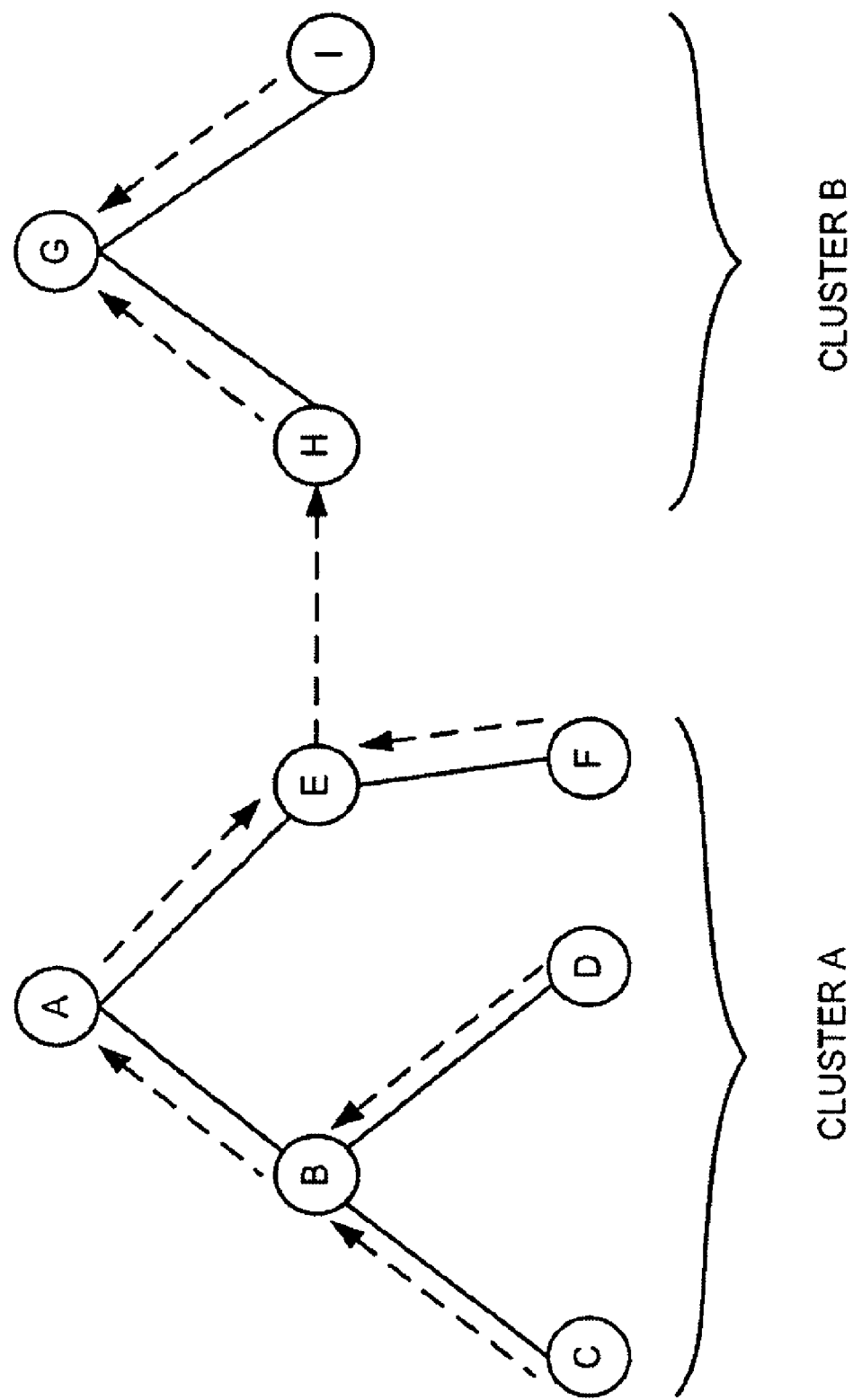
FIG. 13 is a simplified diagram of several sample aspects of timing flow for intra-cluster synchronization.

Referring now to FIGS. 12 and 13, as mentioned above, timing information received by a given node of a cluster may be distributed to other nodes of the cluster to enable the entire cluster to be synchronized to a newly selected timing source (e.g., an access point of a neighboring cluster). FIG. 12 illustrates sample operations that may be performed to synchronize the nodes of the cluster to a selected timing source. FIG. 13 illustrates sample inter-node timing relationships between clusters.

As represented by block 1202 of FIG. 12, each of the nodes of a given cluster may acquire synchronization information from its neighboring nodes that are associated with some other cluster. As an example, FIG. 13 illustrates a pair of clusters A and B where a node E of cluster A acquires synchronization information from a node H of cluster B. In this example, a node G serves as the primary timing source for the nodes H and I of cluster B.

In accordance with the teachings herein, an access point of a given cluster may elect to synchronize to a new timing source in the event that timing source is associated with a higher priority synchronization metric (e.g., the associated timing source is of higher quality). In some implementations a root access point for the cluster may decide which timing will be adopted by the cluster. Here, the root access point may comprise, for example, a wired access point.

Accordingly, as represented by block 1204, the nodes of the cluster may pass all of the timing-related information they have received to the root access point (e.g., node A of cluster A). For example, attached access points may forward timing reports comprising any synchronization metrics they have received. In addition, each access terminal may send similar timing reports to the access point that serves that particular access terminal. In a similar manner as discussed above, these timing reports may include indications relating to the signal strength and timeslot timing offsets for the neighboring asynchronous access point or access terminal (e.g., from cluster B) that transmitted the synchronization metrics (e.g., that was received at cluster A).

As represented by block 1206, the root access point collects this information to determine whether to synchronize to any of the associated timing references. For example, the root access point A may compare the synchronization metrics associated with all the received timing references to determine whether any of these synchronization metrics have a higher priority than the current synchronization metric of cluster A.

As represented by block 1208, the nodes in the cluster may be configured to receive the new timing from a designated node of the cluster. For example, in some implementations all of the nodes in a cluster may synchronize to their parent such that all timing ultimately flows from the root access point. In this case, the root access point may track the new timing associated with the selected synchronization metric by receiving timing correction information (e.g., timing offset value updates) from the node that receives the selected synchronization metric from a neighboring cluster.

In some implementations the root access point may designate the node (e.g., an access point) that receives the selected synchronization metric as the timing root for that cluster. In this case, all of the nodes of the cluster may receive their timing from the timing root. Here, all of the other nodes in the cluster may continue to synchronize to their parent unless they are located on a timing path between the timing root and the root access point. In the event the node is located on this path, the node will synchronize to its child node in the path to the timing root. Once the timing root of a cluster synchronizes to the new timing source, all of the nodes in a cluster may advertise the new synchronization metric.

The dashed arrows of FIG. 13 illustrates an example where node E has been designated as the timing root for cluster A since it receives higher priority timing from node H of cluster B. Here, it may be seen that nodes A and F acquire their timing from node E. Node B then acquires its timing from node A, while nodes C and D acquire their timing from node B.

From the above it may be seen that the root node of a given cluster may be different than the root of an associated synchronization tree. For example, for purposes of data path flow, node A (e.g., a wired AP) may be the root node for cluster A. In contrast, as shown in FIG. 13, node G may be the timing root of a synchronization tree that includes clusters A and B.

Various advantages may be achieved through the use of a synchronization scheme as taught herein. For example, synchronization between clusters may be achieved through the use of relatively simple broadcast timing signals. Accordingly, synchronization may be achieved without transmitting messages between the clusters (e.g., exchanging unicast messages over-the-air or via a wired backhaul).

Moreover, in some aspects all of the nodes that use the same synchronization metric may transmit their respective synchronization metric message signals at the same time. In this case, the energy associated with each synchronization metric transmission may be effectively added together, thereby improving the quality (e.g., the range) of the metric signal. As a result, it may be easier for other nodes to synchronize to this synchronization metric.

Also, in some aspects a node may use hop count information provided by a synchronization metric to synchronize to other timing in a system. For example, in some implementations certain hop counts are associated with certain timeslots. Thus, upon receipt at a given point in time of a metric with a given hop count, a node may determine the point in time when a synchronization metric associated with a different hop count (e.g., a smaller hop count) may be transmitted.

A synchronization scheme based in accordance the teachings herein may be implemented in various ways. For example, the nodes in a system may employ various schemes to generate and transmit synchronization metrics. In addition, the nodes in a system may monitor synchronization metrics and synchronize to the timing associated with the synchronization metrics in a variety of ways.

In some implementations the timing of neighboring nodes may be obtained from synchronization metric signals and acquisition signals that are transmitted via overhead channels. Each of these signals may be transmitted on a regular basis, however, the synchronization metric may be sent less frequently than the acquisition signal. For example, a tracking access point may only monitor for a synchronization metric from a target access point at intervals that are frequent enough to maintain synchronization. Here, the appropriate receive time interval may be a function of the typical clock drifts of the target and tracking access points. For example, for a 0.1 ppm clock drift, if 50 microsecond accuracy is desired, a node may be able to maintain synchronization for approximately 500 seconds.

In some cases, the synchronization metric may be signaled via a forward link timeslot of an access point (e.g., along with other broadcast messages in that timeslot). Such a scheme may result in lower overhead for a tracking access point since the tracking access point may only need to reconfigure its receiver to listen for the synchronization metric at the specific times the designated target access point transmits its synchronization metrics. In other words, in this case, synchronization metrics may be transmitted during a transmit timeslot of the tracking access point. Thus, at the designated times the tracking access point may switch from transmitting during its transmit timeslot to receiving during its transmit timeslot.

It should be appreciated, however, that a tracking access point also may monitor for synchronization metrics from other neighboring asynchronous access points (e.g., other than the target access point). Accordingly, the tracking access point may occasionally switch from transmitting to receiving during its transmit timeslots to receive these synchronization metrics. In some implementations, to reduce the amount of overhead that may be lost in such cases, a time division multiplexing control message scheme may be employed such that the tracking access point may still use the control portions of a transmit timeslot in the event the tracking access point conducts receive operations at some time during that transmit timeslot.

As mentioned above, in some cases an access point may receive a synchronization metric via an attached access terminal that receives the synchronization metric from another cluster. In these cases, the access point may use the access terminal to track the target timing. Consequently, the access point may not need to switch from transmitting to receiving during its transmit timeslots to receive the synchronization metric.

In some cases, the synchronization metric may be signaled via a reverse link timeslot of an access point. In these cases, at the designated times the target access point may switch from receiving during its receive timeslot to transmitting the synchronization metric during a portion of its receive timeslot.

In some implementations an access point may optionally transmit identifier information in conjunction with the transmission of its synchronization metric. Such an identifier may be used, for example, for security purposes whereby a tracking access point may verify that the target access point has a valid identity. In addition, a tracking access point may utilize identifier information in the event it receives synchronization metrics from multiple sources. In this case, the tracking access point may use the identifier information to track the number and identity of the access points from which it is receiving signals.

In some implementations a tracking access point may be configured to decode received synchronization metrics based on information received over several synchronization metric transmissions. For example, in some scenarios a synchronization metric may be the same value for a relatively long period of time. In these cases, a tracking access point may collect energy from several synchronization metric transmissions to decode this synchronization metric. Through the use of this technique, the effective range of the transmitted synchronization metric may be extended without significantly impacting the performance of the system.

Various techniques may be employed to adjust a clock (e.g., a timeslot clock) of a given node in conjunction with synchronization to a new timing source. In some implementations a clock may be adjusted in a single step while in other cases a clock may be changed on a gradual basis (e.g., the node may slew its clock). In the latter case, any nodes served by the node that is changing the clock may remain synchronized as long as the clock is slewed at a sufficiently slow rate. In some implementations a clock signal may be advanced or retarded in time. In this way, a clock may only need to be adjusted, at most, an amount of time equal to one half of the duration of a timeslot. In some implementations, the advancement or retardation of a clock may be performed at timeslot boundaries by inserting or deleting chips, respectively, to avoid loss of synchronization.

In some implementations clock drift may be accounted for during the synchronization process. For example, the time at which a tracking access point monitors for the synchronization metric from its target access point may be adjusted based on estimated clock drift between the two access points.

In some implementations a node may change the way it advertises its synchronization metrics while the node is committing to a new metric (e.g., slewing its timeslot clock). For example, in some implementations a node may stop advertising its synchronization metric at this time. In other implementations a node may advertise that it is changing its timing. This change in timing may be indicated, for example, in a type field of the synchronization metric (e.g., type="Changing-Timing").

As used herein, the term "associated" should be construed in its broadest sense (e.g., related to in some manner, etc.). In some cases, the term "associated" also may encompass a communication association procedure whereby one node associates with another node (e.g., to establish some form of communication between the nodes). For convenience, in the above description, nodes that have associated with one another in the communications sense may be referred to as "attached nodes." Here, the term "attached" does not imply that there must be a physical attachment.

Figure 14:
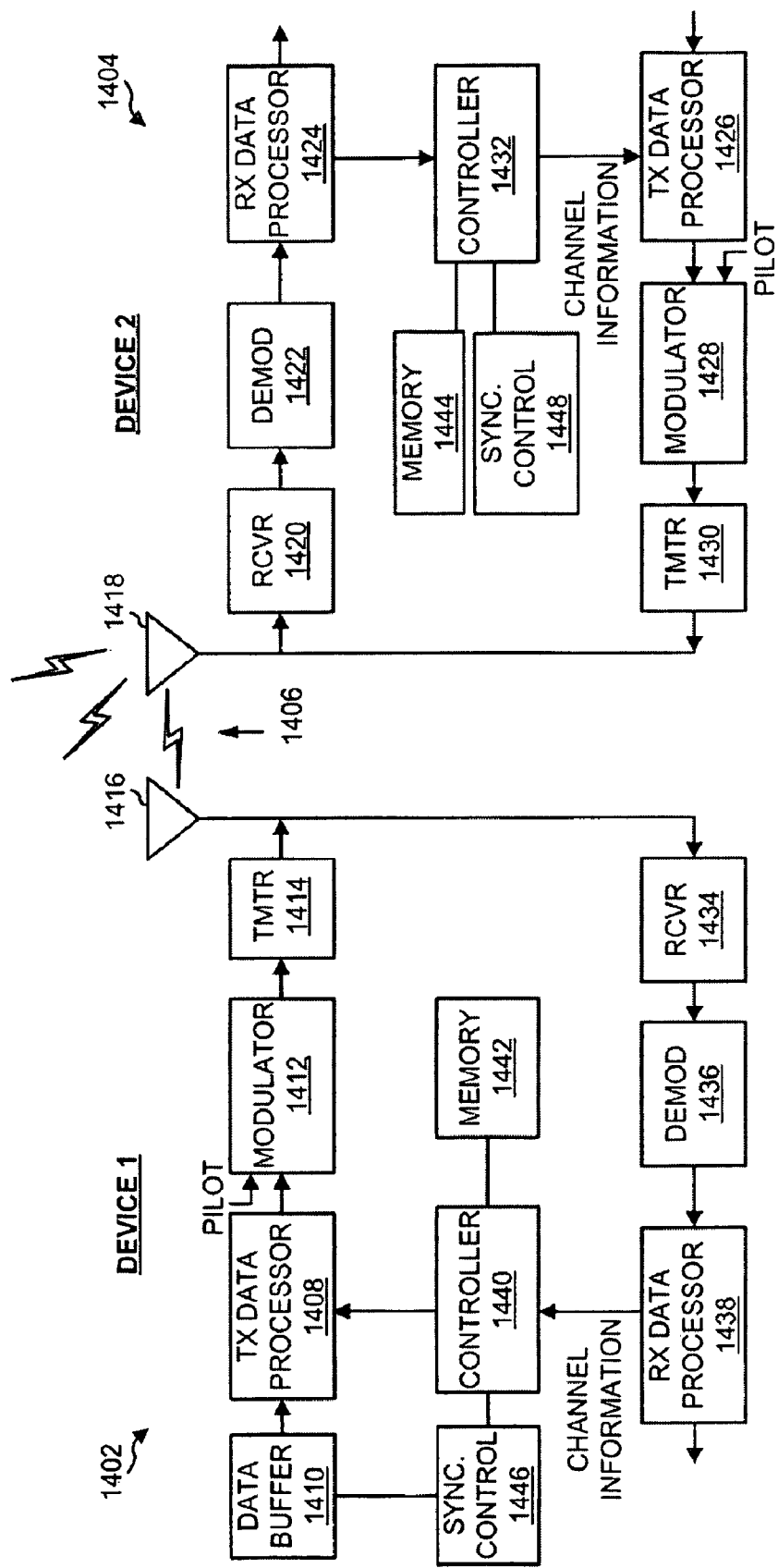
FIG. 14 is a simplified block diagram of several sample aspects of communication components.

The teachings herein may be incorporated into a device employing various components for communicating with at least one other wireless device. FIG. 14 depicts several sample components that may be employed to facilitate communication between devices. Here, a first device 1402 (e.g., an access terminal) and a second device 1404 (e.g., an access point) are adapted to communicate via a wireless communication link 1406 over a suitable medium.

Initially, components involved in sending information from the device 1402 to the device 1404 (e.g., a reverse link) will be treated. A transmit ("TX") data processor 1408 receives traffic data (e.g., data packets) from a data buffer 1410 or some other suitable component. The transmit data processor 1408 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 1412 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 1414 processes (e.g., converts to analog, filters, amplifies, and frequency upconverts) the output chip stream and generates a modulated signal, which is then transmitted from an antenna 1416.

The modulated signals transmitted by the device 1402 (along with signals from other devices in communication with the device 1404) are received by an antenna 1418 of the device 1404. A receiver ("RCVR") 1420 processes (e.g., conditions and digitizes) the received signal from the antenna 1418 and provides received samples. A demodulator ("DEMOD") 1422 processes (e.g., demodulates and detects) the received samples and provides detected data symbols, which may be a noisy estimate of the data symbols transmitted to the device 1404 by the other device(s). A receive ("RX") data processor 1424 processes (e.g., symbol demaps, deinterleaves, and decodes) the detected data symbols and provides decoded data associated with each transmitting device (e.g., device 1402).

Components involved in sending information from the device 1404 to the device 1402 (e.g., a forward link) will be now be treated. At the device 1404, traffic data is processed by a transmit ("TX") data processor 1426 to generate data symbols. A modulator 1428 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 1430 and transmitted from the antenna 1418. In some implementations signaling for the forward link may include power control commands and other information (e.g., relating to a communication channel) generated by a controller 1432 for all devices (e.g. terminals) transmitting on the reverse link to the device 1404.

At the device 1402, the modulated signal transmitted by the device 1404 is received by the antenna 1416, conditioned and digitized by a receiver ("RCVR") 1434, and processed by a demodulator ("DEMOD") 1436 to obtain detected data symbols. A receive ("RX") data processor 1438 processes the detected data symbols and provides decoded data for the device 1402 and the forward link signaling. A controller 1440 receives power control commands and other information to control data transmission and to control transmit power on the reverse link to the device 1404.

The controllers 1440 and 1432 direct various operations of the device 1402 and the device 1404, respectively. For example, a controller may determine an appropriate filter, reporting information about the filter, and decode information using a filter. Data memories 1442 and 1444 may store program codes and data used by the controllers 1440 and 1432, respectively.

FIG. 14 also illustrates that the communication components may include one or more components that provide synchronization-related functionality as taught herein. For example, a synchronization ("SYNC.") control component 1446 may cooperate with the controller 1440 and/or other components of the device 1402 to send and receive signals to another device (e.g., device 1404) as taught herein. Similarly, a synchronization control component 1448 may cooperate with the controller 1432 and/or other components of the device 1404 to send and receive signals to another device (e.g., device 1402).

The teachings herein may be incorporated into (e.g., implemented within or performed by) a variety of apparatuses (e.g., devices). For example, each node may be configured, or referred to in the art, as an access point ("AP"), NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), Relay Station, or some other terminology. Certain nodes also may be referred to as subscriber stations. A subscriber station also may be known as a subscriber unit, a mobile station, a remote station, a remote terminal, an access terminal, a user terminal, a user agent, a user device, or user equipment. In some implementations a subscriber station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless medium.

As mentioned above, in some aspects a wireless node may comprise an access device (e.g., a cellular or Wi-Fi access point) for a communication system. Such an access device may provide, for example, connectivity for or to a network (e.g., a wide area network such as the Internet or a cellular network) via a wired or wireless communication link. Accordingly, the access device may enable another device (e.g., a Wi-Fi station) to access the network or some other functionality.

A wireless node may thus include various components that perform functions based on data transmitted by or received at the wireless node. For example, an access point and an access terminal may include an antenna for transmitting and receiving communication signals (e.g., data and control such as timing reference signals). An access point also may include a traffic manager configured to manage data traffic flows that its receiver receives from a plurality of wireless nodes or that its transmitter transmits to a plurality of wireless nodes. In addition, an access terminal may include a user interface configured to output an indication based on communication associated with a wireless node (e.g., based on data received via the receiver) or based on data received according to timing that is based on a defined synchronization metric.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 504 and receiver 506) that may include various components (e.g., signal generators and signal processors) that facilitate communication over a wireless medium.

Figure 15:
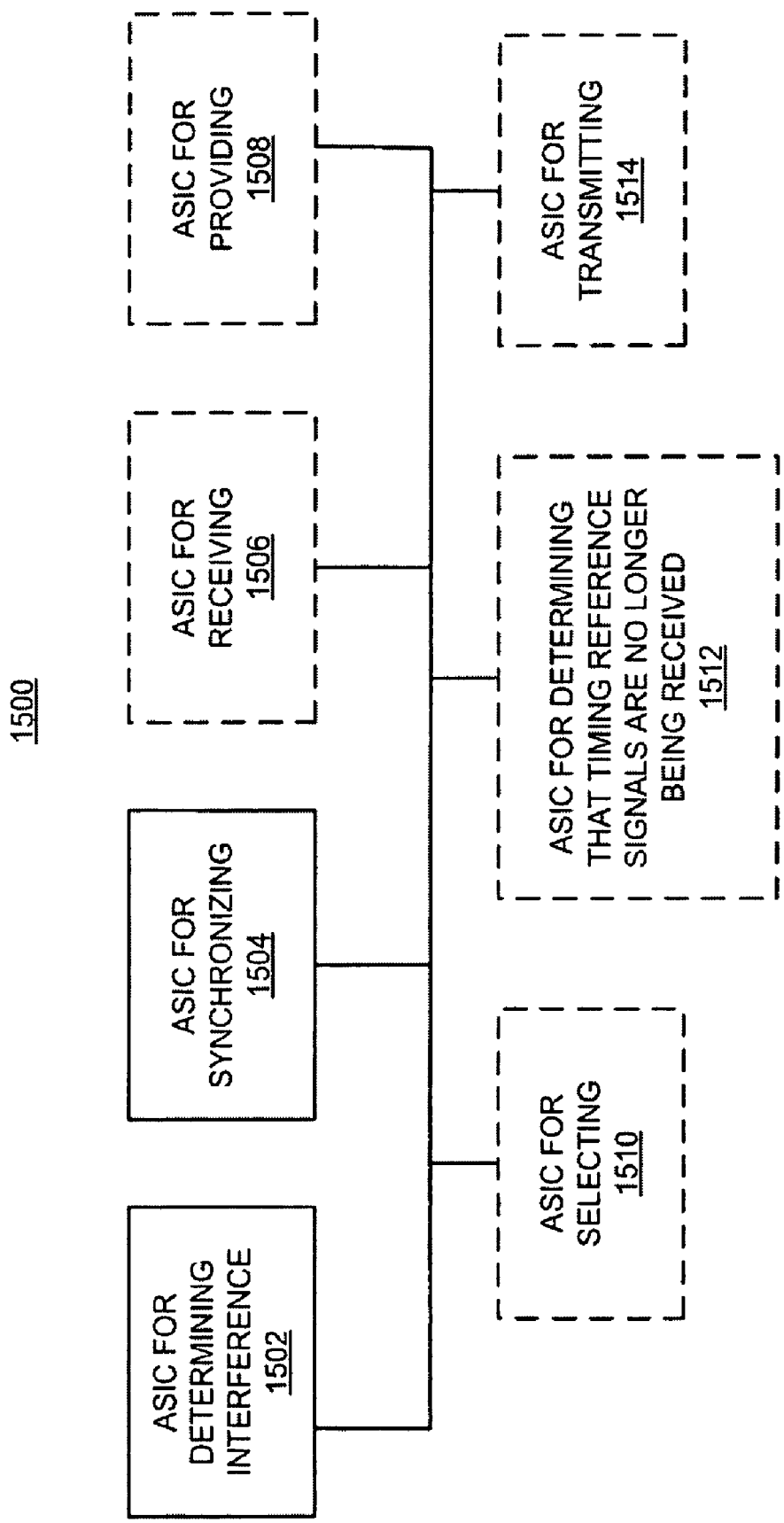
FIGS. 15-17 are simplified block diagrams of several sample aspects of apparatuses configured to facilitate synchronization as taught herein.
Figure 16:
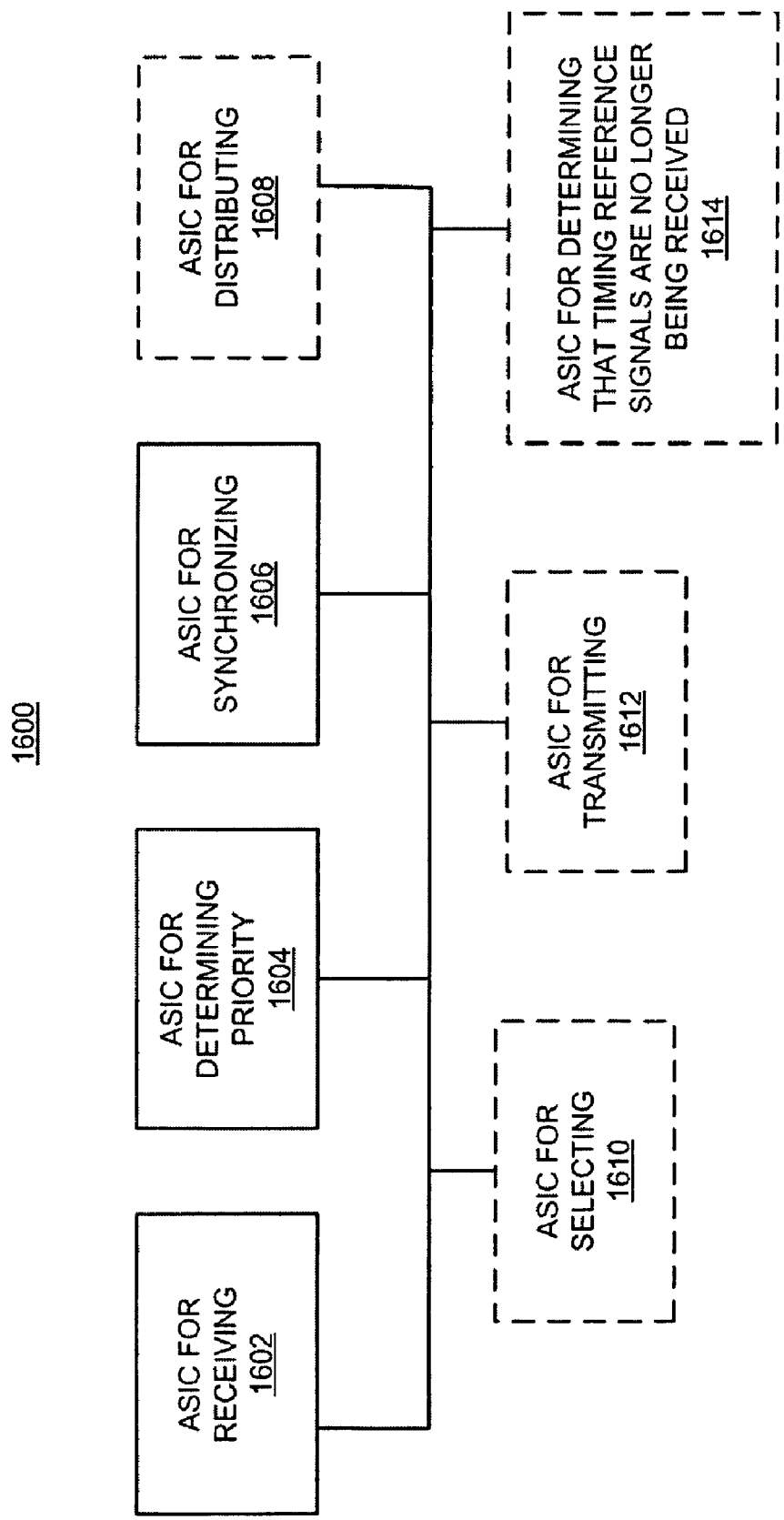
Figure 17:
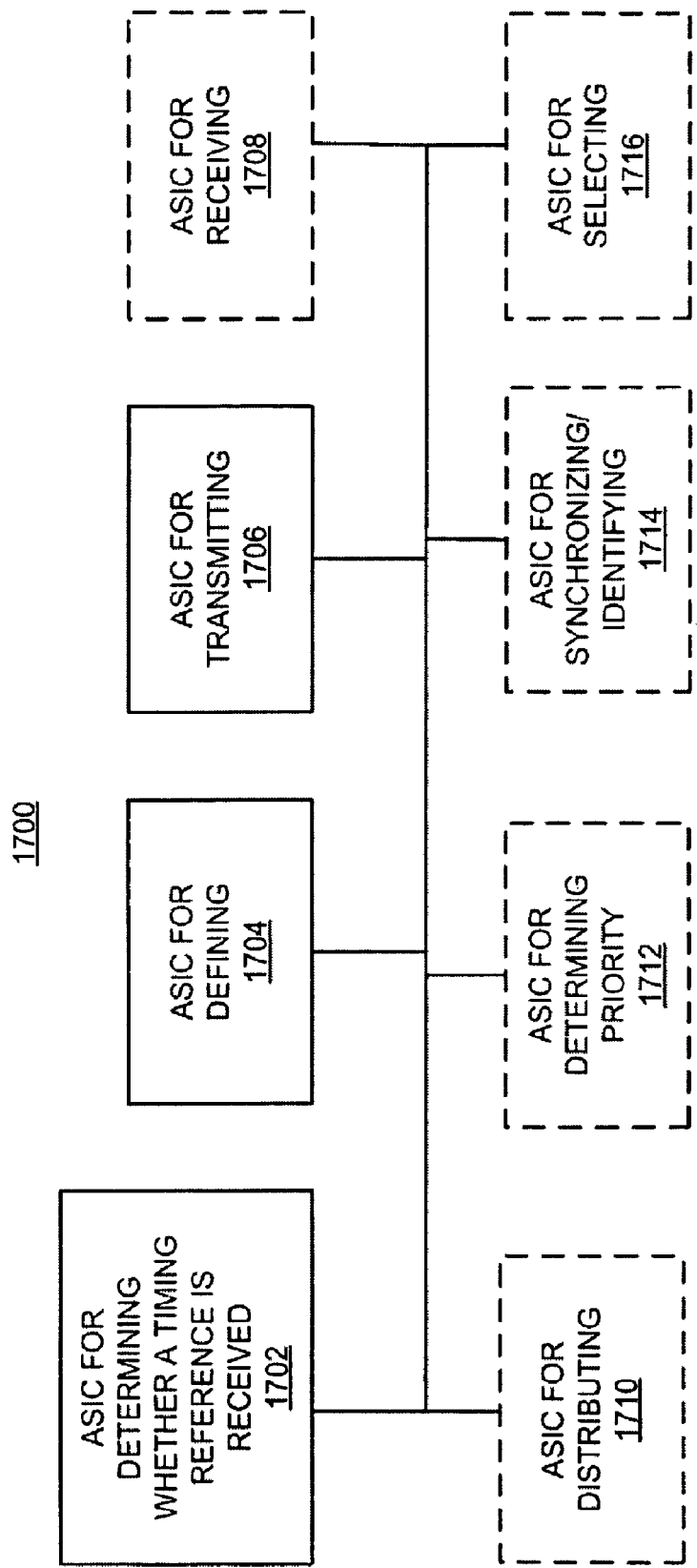

The components described herein may be implemented in a variety of ways. Referring to FIGS. 15-17, apparatuses 1500, 1600, and 1700 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 1500, 1600, and 1700 may include one or more modules that may perform one or more of the functions described above with regard to various figures. For example, an ASIC for determining interference 1502 may correspond to, for example, an interference controller as discussed herein. An ASIC for synchronizing 1504 or 1606 may correspond to, for example, a synchronization controller as discussed herein. An ASIC for receiving 1506, 1602, or 1708 may correspond to, for example, a receiver as discussed herein. An ASIC for providing 1508 may correspond to, for example, a transmitter as discussed herein. An ASIC for selecting 1510, 1610 or 1716 may correspond to, for example, a timing/metric selector as discussed herein. An ASIC for determining whether timing reference signals are being received 1512, 1614, or 1702 may correspond to, for example, a timing processor as discussed herein. An ASIC for transmitting 1514, 1612, or 1706 may correspond to, for example, a transmitter as discussed herein. An ASIC for determining priority 1604 or 1712 may correspond to, for example, a timing/metric selector as discussed herein. An ASIC for distributing 1608 or 1710 may correspond to, for example, a transmitter as discussed herein. An ASIC for defining 1704 may correspond to, for example, a timing/ metric generator as discussed herein. An ASIC for identifying and synchronizing 1714 may correspond to, for example, a synchronization controller as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 1500, 1600, and 1700 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 15-17 as well as other components and functions described herein, may be implemented using any suitable means. Such means also may be implemented, at least in part, using corresponding structure as taught herein. For example, the components described above in conjunction with the "ASIC for" components of FIGS. 15-17 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium (e.g., computer-readable storage device) known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
   determining whether a first timing reference associated with a first wireless node and a second timing reference associated with a second wireless node are asynchronous;
   determining whether transmission by the first wireless node may cause interference with communication associated with the second wireless node; and
   as a result of the asynchronous timing reference determination and the interference determination, synchronizing start and end times of timeslots of the first and second wireless nodes to be approximately equal to control the interference, wherein the synchronization comprises:
      prioritizing the first and second timing references based on comparison of a plurality of parameters of a first synchronization metric with a plurality of parameters of a second synchronization metric, wherein parameters of the first synchronization metric are indicative of timing reliability of the first timing reference and the parameters of the second synchronization metric are indicative of timing reliability of the second timing reference,
      selecting one of the first and second timing references based on the prioritization, and
      adjusting the start and end times of the timeslots of at least one of the first and second wireless nodes based on the selected timing reference.

2. The method of claim 1, wherein the interference may affect reception of data at the second wireless node or at another node that is receiving data from the second wireless node.

3. The method of claim 1, wherein the controlling of the interference results in the first wireless node reducing transmission power or abstaining from transmitting during at least portion of a timeslot.

4. The method of claim 1, wherein the synchronization comprises synchronizing the first wireless node to the second wireless node or synchronizing the second wireless node to the first wireless node.

5. The method of claim 1, wherein the first synchronization metric is transmitted by the first wireless node and the second synchronization metric is transmitted by the second wireless node.

6. The method of claim 1, wherein the synchronization metrics are defined to prevent a race condition involving the first wireless node synchronizing to timing of the second wireless node and the second wireless node synchronizing to timing of the first wireless node.

7. The method of claim 1, wherein the parameters of each synchronization metric indicate at least one of the group consisting of: whether an associated timing source is associated with a GPS signal, whether an associated timing source is associated with a stationary wireless node, whether an associated timing source is associated with a mobile wireless node, whether an associated timing source is associated with a wired access point, and a quality of a clock source of an associated wireless node.

8. The method of claim 1, wherein the parameters of each synchronization metric comprise at least one indication relating to at least one of the group consisting of: a number of node hops to a timing source, a random number, and a sequence number.

9. The method of claim 1, wherein the synchronization comprises synchronizing to timing associated with reception of the first synchronization metric or the second synchronization metric.

10. The method of claim 1, wherein the synchronization comprises receiving timing reference signals from the first wireless node via an access terminal.

11. The method of claim 10, wherein the access terminal is associated with the second wireless node.

12. The method of claim 10, wherein the access terminal is associated with the first wireless node.

13. The method of claim 1, further comprising providing timing reference signals based on timing of the first wireless node to each node of a set of wireless nodes to synchronize timing of each node of the set of wireless nodes to the timing of the first wireless node;
   wherein the set of wireless nodes is associated with the second wireless node.

14. The method of claim 13, wherein:
   the second wireless node receives the timing reference signals from the first wireless node via a third wireless node;
   the third wireless node is one of the nodes of the set of wireless nodes; and
   the second wireless node comprises a root node for the set of wireless nodes.

15. The method of claim 1, further comprising:
   receiving, from a plurality of wireless nodes, identical synchronization metrics associated with different timing sources;
   selecting a synchronization metric associated with a timing reliability that is higher than a timing reliability associated with the identical synchronization metrics; and
   transmitting the selected synchronization metric to enable the plurality of wireless nodes to synchronize to timing associated with the selected synchronization metric.

16. The method of claim 1, further comprising:
   receiving, at the second wireless node, timing reference signals from the first wireless node, wherein the timing reference signals are associated with the first synchronization metric;
   determining that timing reference signals associated with the first synchronization metric are no longer being received from the first wireless node;
   identifying other timing reference signals that are associated with the first synchronization metric and that are provided by a third wireless node; and
   synchronizing to the other timing reference signals.

17. The method of claim 1, further comprising:
   determining that timing reference signals associated with the first synchronization metric are no longer being received at the second wireless node;
   selecting a highest timing reliability synchronization metric from a plurality of received synchronization metrics as a result of the determination that timing reference signals associated with the first synchronization metric are no longer being received; and
   synchronizing to timing associated with the selected synchronization metric.

18. An apparatus for wireless communication, comprising:
   an interference controller configured to determine whether a first timing reference associated with a first wireless node and a second timing reference associated with a second wireless node are asynchronous, and determine whether transmission by the first wireless node may cause interference with communication associated with the second wireless node; and
   a synchronization controller configured to synchronize, as a result of the asynchronous timing reference determination and the interference determination, start and end times of timeslots of the first and second wireless nodes to be approximately equal to control the interference, wherein the synchronization comprises:
prioritizing the first and second timing references based on comparison of a plurality of parameters of a first synchronization metric with a plurality of parameters of a second synchronization metric, wherein parameters of the first synchronization metric are indicative of timing reliability of the first timing reference and the parameters of the second synchronization metric are indicative of timing reliability of the second timing reference,
selecting one of the first and second timing references based on the prioritization, and
adjusting the start and end times of the timeslots of at least one of the first and second wireless nodes based on the selected timing reference.

19. The apparatus of claim 18, wherein the interference may affect reception of data at the second wireless node or at another node that is receiving data from the second wireless node.

20. The apparatus of claim 18, wherein the controlling of the interference results in the first wireless node reducing transmission power or abstaining from transmitting during at least portion of a timeslot.

21. The apparatus of claim 18, wherein the synchronization controller is further configured to synchronize the first wireless node to the second wireless node or facilitate synchronizing the second wireless node to the first wireless node.

22. The apparatus of claim 18, wherein the first synchronization metric is transmitted by the first wireless node and the second synchronization metric is transmitted by the second wireless node.

23. The apparatus of claim 18, wherein the synchronization metrics are defined to prevent a race condition involving the first wireless node synchronizing to timing of the second wireless node and the second wireless node synchronizing to timing of the first wireless node.

24. The apparatus of claim 18, wherein the parameters of each synchronization metric indicate at least one of the group consisting of: whether an associated timing source is associated with a GPS signal, whether an associated timing source is associated with a stationary wireless node, whether an associated timing source is associated with a mobile wireless node, whether an associated timing source is associated with a wired access point, and a quality of a clock source of an associated wireless node.

25. The apparatus of claim 18, wherein the parameters of each synchronization metric comprise at least one indication relating to at least one of the group consisting of: a number of node hops to a timing source, a random number, and a sequence number.

26. The apparatus of claim 18, wherein the synchronization controller is further configured to synchronize to timing associated with reception of the first synchronization metric or the second synchronization metric.

27. The apparatus of claim 18, further comprising a receiver configured to receive timing reference signals from the first wireless node via an access terminal.

28. The apparatus of claim 27, wherein the access terminal is associated with the second wireless node.

29. The apparatus of claim 27, wherein the access terminal is associated with the first wireless node.

30. The apparatus of claim 18, further comprising a timing generator configured to provide timing reference signals based on timing of the first wireless node to each node of a set of wireless nodes to synchronize timing of each node of the set of wireless nodes to the timing of the first wireless node; wherein the set of wireless nodes is associated with the second wireless node.

31. The apparatus of claim 30, wherein:
the second wireless node receives the timing reference signals from the first wireless node via a third wireless node;
the third wireless node is one of the nodes of the set of wireless nodes; and
the second wireless node comprises a root node for the set of wireless nodes.

32. The apparatus of claim 18, further comprising:
a receiver configured to receive, from a plurality of wireless nodes, identical synchronization metrics associated with different timing sources;
a metric generator configured to select a synchronization metric associated with a timing reliability that is higher than a timing reliability associated with the identical synchronization metrics; and
a transmitter configured to transmit the selected synchronization metric to enable the plurality of wireless nodes to synchronize to timing associated with the selected synchronization metric.

33. The apparatus of claim 18, further comprising:
a receiver configured to receive, at the second wireless node, timing reference signals from the first wireless node, wherein the timing reference signals are associated with the first synchronization metric; and
a timing processor configured to determine that timing reference signals associated with the first synchronization metric are no longer being received from the first wireless node;
wherein the synchronization controller is further configured to identify and synchronize to other timing reference signals that are associated with the first synchronization metric and that are provided by a third wireless node.

34. The apparatus of claim 18, further comprising:
a timing processor configured to determine that timing reference signals associated with the first synchronization metric are no longer being received at the second wireless node; and
a metric selector configured to select a highest timing reliability synchronization metric from a plurality of received synchronization metrics as a result of the determination that timing reference signals associated with the first synchronization metric are no longer being received;
wherein the synchronization controller is further configured to synchronize to timing associated with the selected synchronization metric.

35. An apparatus for wireless communication, comprising:
means for determining whether a first timing reference associated with a first wireless node and a second timing reference associated with a second wireless node are asynchronous;
means for determining whether transmission by the first wireless node may cause interference with communication associated with the second wireless node; and
means for synchronizing, as a result of the asynchronous timing reference determination and the interference determination, start and end times of timeslots of the first and second wireless nodes to be approximately equal to control the interference, wherein the synchronization comprises:
prioritizing the first and second timing references based on comparison of a plurality of parameters of a first synchronization metric with a plurality of parameters of a second synchronization metric, wherein parameters of the first synchronization metric are indicative of timing reliability of the first timing reference and the parameters of the second synchronization metric are indicative of timing reliability of the second timing reference, selecting one of the first and second timing references based on the prioritization, and adjusting the start and end times of the timeslots of at least one of the first and second wireless nodes based on the selected timing reference.

36. The apparatus of claim 35, wherein the interference may affect reception of data at the second wireless node or at another node that is receiving data from the second wireless node.

37. The apparatus of claim 35, wherein the controlling of the interference results in the first wireless node reducing transmission power or abstaining from transmitting during at least portion of a timeslot.

38. The apparatus of claim 35, wherein the means for synchronizing synchronizes the first wireless node to the second wireless node or facilitates synchronizing the second wireless node to the first wireless node.

39. The apparatus of claim 35, wherein the first synchronization metric is transmitted by the first wireless node and the second synchronization metric is transmitted by the second wireless node.

40. The apparatus of claim 35, wherein the synchronization metrics are defined to prevent a race condition involving the first wireless node synchronizing to timing of the second wireless node and the second wireless node synchronizing to timing of the first wireless node.

41. The apparatus of claim 35, wherein the parameters of each synchronization metric indicate at least one of the group consisting of: whether an associated timing source is associated with a GPS signal, whether an associated timing source is associated with a stationary wireless node, whether an associated timing source is associated with a mobile wireless node, whether an associated timing source is associated with a wired access point, and a quality of a clock source of an associated wireless node.

42. The apparatus of claim 35, wherein the parameters of each synchronization metric comprise at least one indication relating to at least one of the group consisting of: a number of node hops to a timing source, a random number, and a sequence number.

43. The apparatus of claim 35, wherein the means for synchronizing synchronizes to timing associated with reception of the first synchronization metric or the second synchronization metric.

44. The apparatus of claim 35, further comprising means for receiving timing reference signals from the first wireless node via an access terminal.

45. The apparatus of claim 44, wherein the access terminal is associated with the second wireless node.

46. The apparatus of claim 44, wherein the access terminal is associated with the first wireless node.

47. The apparatus of claim 35, further comprising means for providing timing reference signals based on timing of the first wireless node to each node of a set of wireless nodes to synchronize timing of each node of the set of wireless nodes to the timing of the first wireless node;

wherein the set of wireless nodes is associated with the second wireless node.

48. The apparatus of claim 47, wherein:

the second wireless node receives the timing reference signals from the first wireless node via a third wireless node;

the third wireless node is one of the nodes of the set of wireless nodes; and the second wireless node comprises a root node for the set of wireless nodes.

49. The apparatus of claim 35, further comprising:

means for receiving, from a plurality of wireless nodes, identical synchronization metrics associated with different timing sources;

means for selecting a synchronization metric having a higher timing reliability than a timing reliability associated with the identical synchronization metrics; and means for transmitting the selected synchronization metric to enable the plurality of wireless nodes to synchronize to timing associated with the selected synchronization metric.

50. The apparatus of claim 35, further comprising:

means for receiving, at the second wireless node, timing reference signals from the first wireless node, wherein the timing reference signals are associated with the first synchronization metric; and means for determining that timing reference signals associated with the first synchronization metric are no longer being received from the first wireless node;

wherein the means for synchronizing identifies and synchronizes to other timing reference signals that are associated with the first synchronization metric and that are provided by a third wireless node.

51. The apparatus of claim 35, further comprising:

means for determining that timing reference signals associated with the first synchronization metric are no longer being received at the second wireless node; and means for selecting a highest timing reliability synchronization metric from a plurality of received synchronization metrics as a result of the determination that timing reference signals associated with the first synchronization metric are no longer being received;

wherein the means for synchronizing synchronizes to timing associated with the selected synchronization metric.

52. A computer-program product for wireless communication, comprising:

computer-readable storage device comprising codes executable by at least one computer to:

determine whether a first timing reference associated with a first wireless node and a second timing reference associated with a second wireless node are asynchronous;

determine whether transmission by the first wireless node may cause interference with communication associated with the second wireless node; and synchronize, as a result of the asynchronous timing reference determination and the interference determination, start and end times of timeslots of the first and second wireless nodes to be approximately equal to control the interference, wherein the synchronization comprises:

prioritizing the first and second timing references based on comparison of a plurality of parameters of a first synchronization metric with a plurality of parameters of a second synchronization metric, wherein parameters of the first synchronization metric are indicative of timing reliability of the first timing reference and the parameters of the second synchronization metric are indicative of timing reliability of the second timing reference, selecting one of the first and second timing references based on the prioritization, and adjusting the start and end times of the timeslots of at least one of the first and second wireless nodes based on the selected timing reference.

53. An access point for wireless communication, comprising:

an antenna;

an interference controller configured to determine whether a first timing reference associated with a first wireless node and a second timing reference associated with a second wireless node are asynchronous, and determine whether transmission by the first wireless node may cause interference with communication associated with the second wireless node; and a synchronization controller configured to synchronize, as a result of the asynchronous timing reference determination and the interference determination, start and end times of timeslots of the first and second wireless nodes to be approximately equal to control the interference, wherein the synchronization comprises:

prioritizing the first and second timing references based on comparison of a plurality of parameters of a first synchronization metric with a plurality of parameters of a second synchronization metric, wherein parameters of the first synchronization metric are indicative of timing reliability of the first timing reference and the parameters of the second synchronization metric are indicative of timing reliability of the second timing reference, selecting one of the first and second timing references based on the prioritization, and adjusting the start and end times of the timeslots of at least one of the first and second wireless nodes based on the selected timing reference.

54. An access terminal for wireless communication, comprising:

an interference controller configured to determine whether a first timing reference associated with a first wireless node and a second timing reference associated with a second wireless node are asynchronous, and determine whether transmission by the first wireless node may cause interference with communication associated with the second wireless node;

a synchronization controller configured to synchronize, as a result of the asynchronous timing reference determination and the interference determination, start and end times of timeslots of the first and second wireless nodes to be approximately equal to control the interference, wherein the synchronization comprises:

prioritizing the first and second timing references based on comparison of a plurality of parameters of a first synchronization metric with a plurality of parameters of a second synchronization metric, wherein parameters of the first synchronization metric are indicative of timing reliability of the first timing reference and the parameters of the second synchronization metric are indicative of timing reliability of the second timing reference, selecting one of the first and second timing references based on the prioritization, and adjusting the start and end times of the timeslots of at least one of the first and second wireless nodes based on the selected timing reference; and a user interface configured to output an indication based on the communication.

55. The method of claim 1, wherein:

the comparison comprises a parameter-by-parameter comparison of the parameters of the synchronization metrics to identify a corresponding set of parameters of the synchronization metrics that do not match; and the parameter-by-parameter comparison is performed according to a parameter ordering defined for the synchronization metrics.

56. A method of wireless communication, comprising:

receiving, at a first wireless node, a first timing reference signal and a first synchronization metric that are associated with a first timing source, wherein the first synchronization metric comprises a plurality of parameters indicative of timing reliability of the first timing source;

determining whether the first timing reference signal or a second timing reference signal associated with a second timing source has a higher timing reliability, wherein the determination comprises comparing the parameters of the first synchronization metric with a plurality of parameters of a second synchronization metric associated with the second timing source, and wherein the parameters of the second synchronization metric are indicative of timing reliability of the second timing source; and synchronizing to the timing reference signal determined to have the higher timing reliability, wherein the synchronizing comprises setting start and end times of timeslots of the first wireless node to approximately equal start and end times of timeslots of the first timing source or the second timing source.

57. The method of claim 56, wherein each synchronization metric comprises an indication of a priority of an associated timing reference.

58. The method of claim 57, wherein the priorities of the associated timing references are defined to prevent a race condition involving the first wireless node synchronizing to timing of a second wireless node and the second wireless node synchronizing to timing of the first wireless node.

59. The method of claim 56, wherein the parameters of each synchronization metric indicate at least one of the group consisting of: whether the associated timing source is associated with a GPS signal, whether the associated timing source is associated with a stationary wireless node, whether the associated timing source is associated with a mobile wireless node, whether the associated timing source is associated with a wired access point, and a quality of a clock source of an associated wireless node.

60. The method of claim 56, wherein the parameters of each synchronization metric comprise at least one indication relating to at least one of the group consisting of: a number of node hops to the associated timing source, a random number, and a sequence number.

61. The method of claim 56, wherein the synchronization metrics are received along with the timing reference signals.

62. The method of claim 56, wherein the first timing reference signal is received via a second wireless node that is associated with the first wireless node.

63. The method of claim 56, further comprising distributing timing to a set of wireless nodes that is associated with the first wireless node, wherein the distributed timing is based on the timing reference signal that is determined to have the higher timing reliability.

64. The method of claim 63, wherein:
the first wireless node receives the timing reference signal that is determined to have the higher timing reliability via a second wireless node;
the second wireless node is one of the nodes of the set of wireless nodes; and
the first wireless node comprises a root node for the set of wireless nodes.

65. The method of claim 63, further comprising:
receiving at least one additional timing reference signal via at least one of the set of wireless nodes;
determining whether a third timing reference signal of the at least one additional timing reference signal has a higher timing reliability than the first timing reference signal and the second timing reference signal; and
synchronizing to the third timing reference signal if the third timing reference signal has a higher timing reliability.

66. The method of claim 56, further comprising:
receiving, from a plurality of wireless nodes, identical synchronization metrics associated with different timing sources;
selecting a synchronization metric associated with a timing reliability that is higher than a timing reliability associated with the identical synchronization metrics; and
transmitting the selected synchronization metric to enable the plurality of wireless nodes to synchronize to timing associated with the selected synchronization metric.

67. The method of claim 56, wherein the timing reference signal that is determined to have the higher timing reliability is associated with the first synchronization metric and is received from a second wireless node, the method further comprising:
determining that timing reference signals associated with the first synchronization metric are no longer being received from the second wireless node;
identifying other timing reference signals that are associated with the first synchronization metric and that are provided by a third wireless node; and
synchronizing to the other timing reference signals.

68. The method of claim 56, wherein the timing reference signal that is determined to have the higher timing reliability is associated with the first synchronization metric, the method further comprising:
determining that timing reference signals associated with the first synchronization metric are no longer being received at the first wireless node;
selecting a highest timing reliability synchronization metric from a plurality of received synchronization metrics as a result of the determination that timing reference signals associated with the first synchronization metric are no longer being received; and
synchronizing to timing associated with the selected synchronization metric.

69. An apparatus for wireless communication, comprising:
a receiver configured to receive a first timing reference signal and a first synchronization metric that are associated with a first timing source, wherein the first synchronization metric comprises a plurality of parameters indicative of timing reliability of the first timing source;
a timing selector configured to determine whether the first timing reference signal or a second timing reference signal associated with a second timing source has a higher timing reliability, wherein the determination comprises comparing the parameters of the first synchronization metric with a plurality of parameters of a second synchronization metric associated with the second timing source, and wherein the parameters of the second synchronization metric are indicative of timing reliability of the second timing source; and
a synchronization controller configured to synchronize to the timing reference signal determined to have the higher timing reliability, wherein the synchronizing comprises setting start and end times of timeslots of the apparatus to approximately equal start and end times of timeslots of the first timing source or the second timing source.

70. The apparatus of claim 69, wherein each synchronization metric comprises an indication of a priority of an associated timing reference.

71. The apparatus of claim 70, wherein the priorities of the associated timing references are defined to prevent a race condition involving the apparatus synchronizing to timing of a wireless node and the wireless node synchronizing to timing of the apparatus.

72. The apparatus of claim 69, wherein the parameters of each synchronization metric indicate at least one of the group consisting of: whether the associated timing source is associated with a GPS signal, whether the associated timing source is associated with a stationary wireless node, whether the associated timing source is associated with a mobile wireless node, whether the associated timing source is associated with a wired access point, and a quality of a clock source of an associated wireless node.

73. The apparatus of claim 69, wherein the parameters of each synchronization metric comprise at least one indication relating to at least one of the group consisting of: a number of node hops to the associated timing source, a random number, and a sequence number.

74. The apparatus of claim 69, wherein the synchronization metrics are received along with the timing reference signals.

75. The apparatus of claim 69, wherein the first timing reference signal is received via a wireless node that is associated with the apparatus.

76. The apparatus of claim 69, further comprising a timing generator configured to distribute timing to a set of wireless nodes that is associated with the apparatus, wherein the distributed timing is based on the timing reference signal that is determined to have the higher timing reliability.

77. The apparatus of claim 76, wherein:
the apparatus receives the timing reference signal that is determined to have the higher timing reliability via a first wireless node;
the first wireless node is one of the nodes of the set of wireless nodes; and
the apparatus comprises a root node for the set of wireless nodes.

78. The apparatus of claim 76, wherein:
the receiver is further configured to receive at least one additional timing reference signal via at least one of the set of wireless nodes;
the timing selector is further configured to determine whether a third timing reference signal of the at least one additional timing reference signal has a higher timing reliability than the first timing reference signal and the second timing reference signal; and
the synchronization controller is further configured to synchronize to the third timing reference signal if the third timing reference signal has a higher timing reliability.

79. The apparatus of claim 69, wherein the receiver is further configured to receive, from a plurality of wireless nodes, identical synchronization metrics associated with different timing sources, the apparatus further comprising:

a metric generator configured to select a synchronization metric associated with a timing reliability that is higher than a timing reliability associated with the identical synchronization metrics; and a transmitter configured to transmit the selected synchronization metric to enable the plurality of wireless nodes to synchronize to timing associated with the selected synchronization metric.

80. The apparatus of claim 69, wherein:

the timing reference signal that is determined to have the higher timing reliability is associated with the first synchronization metric and is received from a first wireless node;

the apparatus further comprises a timing processor configured to determine that timing reference signals associated with the first synchronization metric are no longer being received from the first wireless node; and the synchronization controller is further configured to identify and synchronize to other timing reference signals that are associated with the first synchronization metric and that are provided by a second wireless node.

81. The apparatus of claim 69, wherein:

the timing reference signal that is determined to have the higher timing reliability is associated with the first synchronization metric;

the apparatus further comprises a timing processor configured to determine that timing reference signals associated with the first synchronization metric are no longer being received at the apparatus;

the timing selector is further configured to select a highest timing reliability synchronization metric from a plurality of received synchronization metrics as a result of the determination that timing reference signals associated with the first synchronization metric are no longer being received; and the synchronization controller is further configured to synchronize to timing associated with the selected synchronization metric.

82. An apparatus for wireless communication, comprising:

means for receiving a first timing reference signal and a first synchronization metric that are associated with a first timing source, wherein the first synchronization metric comprises a plurality of parameters indicative of timing reliability of the first timing source;

means for determining whether the first timing reference signal or a second timing reference signal associated with a second timing source has a higher timing reliability, wherein the determination comprises comparing the parameters of the first synchronization metric with a plurality of parameters of a second synchronization metric associated with the second timing source, and wherein the parameters of the second synchronization metric are indicative of timing reliability of the second timing source; and means for synchronizing to the timing reference signal determined to have the higher timing reliability, wherein the synchronizing comprises setting start and end times of timeslots of the apparatus to approximately equal start and end times of timeslots of the first timing source or the second timing source.

83. The apparatus of claim 82, wherein each synchronization metric comprises an indication of a priority of an associated timing reference.

84. The apparatus of claim 83, wherein the priorities of the associated timing references are defined to prevent a race condition involving the apparatus synchronizing to timing of a wireless node and the wireless node synchronizing to timing of the apparatus.

85. The apparatus of claim 82, wherein the parameters of each synchronization metric indicate at least one of the group consisting of: whether the associated timing source is associated with a GPS signal, whether the associated timing source is associated with a stationary wireless node, whether the associated timing source is associated with a mobile wireless node, whether the associated timing source is associated with a wired access point, and a quality of a clock source of an associated wireless node.

86. The apparatus of claim 82, wherein the parameters of each synchronization metric comprise at least one indication relating to at least one of the group consisting of: a number of node hops to the associated timing source, a random number, and a sequence number.

87. The apparatus of claim 82, wherein the synchronization metrics are received along with the timing reference signals.

88. The apparatus of claim 82, wherein the first timing reference signal is received via a wireless node that is associated with the apparatus.

89. The apparatus of claim 82, further comprising means for distributing timing to a set of wireless nodes that is associated with the apparatus, wherein the distributed timing is based on the timing reference signal that is determined to have the higher timing reliability.

90. The apparatus of claim 89, wherein:

the apparatus receives the timing reference signal that is determined to have the higher timing reliability via a first wireless node;

the first wireless node is one of the nodes of the set of wireless nodes; and the apparatus comprises a root node for the set of wireless nodes.

91. The apparatus of claim 89, wherein:

the means for receiving receives at least one additional timing reference signal via at least one of the set of wireless nodes;

the means for determining determines whether a third timing reference signal of the at least one additional timing reference signal has a higher timing reliability than the first timing reference signal and the second timing reference signal; and the means for synchronizing synchronizes to the third timing reference signal if the third timing reference signal has a higher timing reliability.

92. The apparatus of claim 82, wherein the means for receiving receives, from a plurality of wireless nodes, identical synchronization metrics associated with different timing sources, the apparatus further comprising:

means for selecting a synchronization metric associated with a timing reliability that is higher than a timing reliability associated with the identical synchronization metrics; and means for transmitting the selected synchronization metric to enable the plurality of wireless nodes to synchronize to timing associated with the selected synchronization metric.

93. The apparatus of claim 82, wherein:

the timing reference signal that is determined to have the higher timing reliability is associated with the first synchronization metric and is received from a first wireless node;

the apparatus further comprises means for determining that timing reference signals associated with the first synchronization metric are no longer being received from the first wireless node; and the means for synchronizing identifies and synchronizes to other timing reference signals that are associated with the first synchronization metric and that are provided by a second wireless node.

94. The apparatus of claim 82, wherein:

the timing reference signal that is determined to have the higher timing reliability is associated with the first synchronization metric;

the apparatus further comprises means for determining that timing reference signals associated with the first synchronization metric are no longer being received at the apparatus;

the means for determining selects a highest timing reliability synchronization metric from a plurality of received synchronization metrics as a result of the determination that timing reference signals associated with the first synchronization metric are no longer being received; and the means for synchronizing synchronizes to timing associated with the selected synchronization metric.

95. A computer-program product for wireless communication, comprising:

computer-readable storage device comprising codes executable by at least one computer to:

receive, at a first wireless node, a first timing reference signal and a first synchronization metric that are associated with a first timing source, wherein the first synchronization metric comprises a plurality of parameters indicative of timing reliability of the first timing source;

determine whether the first timing reference signal or a second timing reference signal associated with a second timing source has a higher timing reliability, wherein the determination comprises comparing the parameters of the first synchronization metric with a plurality of parameters of a second synchronization metric associated with the second timing source, and wherein the parameters of the second synchronization metric are indicative of timing reliability of the second timing source; and synchronize to the timing reference signal determined to have the higher timing reliability, wherein the synchronizing comprises setting start and end times of timeslots of the first wireless node to approximately equal start and end times of timeslots of the first timing source or the second timing source.

96. An access point for wireless communication, comprising:

an antenna;

a receiver configured to receive via the antenna a first timing reference signal and a first synchronization metric that are associated with a first timing source, wherein the first synchronization metric comprises a plurality of parameters indicative of timing reliability of the first timing source;

a timing controller configured to determine whether the first timing reference signal or a second timing reference signal associated with a second timing source has a higher timing reliability, wherein the determination comprises comparing the parameters of the first synchronization metric with a plurality of parameters of a second synchronization metric associated with the second timing source, and wherein the parameters of the second synchronization metric are indicative of timing reliability of the second timing source; and a synchronization controller configured to synchronize to the timing reference signal determined to have the higher timing reliability, wherein the synchronizing comprises setting start and end times of timeslots of the access point to approximately equal start and end times of timeslots of the first timing source or the second timing source.

97. An access terminal for wireless communication, comprising:

a receiver configured to receive a first timing reference signal and a first synchronization metric that are associated with a first timing source, wherein the first synchronization metric comprises a plurality of parameters indicative of timing reliability of the first timing source;

a timing controller configured to determine whether the first timing reference signal or a second timing reference signal associated with a second timing source has a higher timing reliability, wherein the determination comprises comparing the parameters of the first synchronization metric with a plurality of parameters of a second synchronization metric associated with the second timing source, and wherein the parameters of the second synchronization metric are indicative of timing reliability of the second timing source;

a synchronization controller configured to synchronize to the timing reference signal determined to have the higher timing reliability, wherein the synchronizing comprises setting start and end times of timeslots of the access terminal to approximately equal start and end times of timeslots of the first timing source or the second timing source; and a user interface configured to output an indication based on data received via the receiver.

98. The method of claim 56, wherein:

the comparison comprises a parameter-by-parameter comparison of the parameters of the synchronization metrics to identify a corresponding set of parameters of the synchronization metrics that do not match; and the parameter-by-parameter comparison is performed according to a parameter ordering defined for the synchronization metrics.

99. A method of wireless communication, comprising:

determining whether a timing reference signal is received by a first wireless node;

defining a synchronization metric based on the determination, wherein the synchronization metric comprises a plurality of parameters indicative of timing reliability of a timing reference associated with the first wireless node, and wherein the defining of the synchronization metric comprises comparing a plurality of parameters indicative of timing reliability of a first timing source with a plurality of parameters indicative of timing reliability of a second timing source; and transmitting the defined synchronization metric, wherein the transmission of the synchronization metric enables a second wireless node to synchronize start and end times of timeslots of the second wireless node to approximately equal start and end times of timeslots of the first wireless node.

100. The method of claim 99, wherein the timing reference signal comprises a satellite-based timing reference signal.

101. The method of claim 99, wherein the timing reference signal comprises a GPS timing reference signal.

102. The method of claim 99, wherein the timing reference signal relates to another synchronization metric associated with a third wireless node.

103. The method of claim 99, wherein the determination of whether a timing reference signal is received comprises monitoring for another synchronization metric transmitted by a third wireless node.

104. The method of claim 99, wherein the synchronization metric is defined to prevent a race condition involving the first wireless node synchronizing to timing of a second wireless node and the second wireless node synchronizing to timing of the first wireless node.

105. The method of claim 99, wherein the parameters of the synchronization metric indicate at least one of the group consisting of: whether an associated timing source is associated with a GPS signal, whether an associated timing source is associated with a stationary wireless node, whether an associated timing source is associated with a mobile wireless node, whether an associated timing source is associated with a wired access point, and a quality of a clock source of an associated wireless node.

106. The method of claim 99, wherein the parameters of the synchronization metric comprise at least one indication relating to at least one of the group consisting of: a number of node hops to a timing source, a random number, and a sequence number.

107. The method of claim 99, wherein the transmission of the synchronization metric provides another timing reference signal for another wireless node.

108. The method of claim 99, wherein a range associated with the transmission of the synchronization metric is greater than a range associated with transmission of data communication by the first wireless node.

109. The method of claim 99, further comprising receiving the timing reference signal via a third wireless node that is associated with the first wireless node.

110. The method of claim 99, further comprising distributing timing associated with the synchronization metric to a set of wireless nodes associated with the first wireless node.

111. The method of claim 110, wherein:
the first wireless node receives the timing reference signal via a third wireless node;
the third wireless node is one of the nodes of the set of wireless nodes; and
the first wireless node comprises a root node for the set of wireless nodes.

112. The method of claim 99, further comprising:
receiving another synchronization metric associated with a third wireless node;
determining whether the received synchronization metric has a higher timing reliability than the defined synchronization metric; and
synchronizing to another timing reference signal associated with the received synchronization metric based on the determination.

113. The method of claim 99, further comprising:
receiving a first synchronization metric associated with the timing reference signal from a third wireless node;
receiving a second synchronization metric associated with another timing reference signal from a fourth wireless node, wherein the second synchronization metric is identical to the first synchronization metric;
selecting a third synchronization metric having a higher timing reliability than a timing reliability associated with the first and second synchronization metrics; and
transmitting the selected synchronization metric to enable the first and second wireless nodes to synchronize to timing associated with the selected synchronization metric.

114. The method of claim 99, wherein the determination of whether the timing reference signal is received by the first wireless node comprises determining that the first wireless node is receiving, from a third wireless node, timing reference signals associated with a second synchronization metric, the method further comprising:
determining that timing reference signals associated with the second synchronization metric are no longer being received from the third wireless node;
identifying other timing reference signals that are associated with the second synchronization metric and that are provided by a fourth wireless node; and
synchronizing to the other timing reference signals.

115. The method of claim 99, wherein the determination of whether the timing reference signal is received by the first wireless node comprises determining that the first wireless node is receiving, from a third wireless node, timing reference signals associated with a second synchronization metric, the method further comprising:
determining that timing reference signals associated with the second synchronization metric are no longer being received at the first wireless node;
selecting a highest timing reliability synchronization metric from a plurality of received synchronization metrics; and
synchronizing to timing associated the selected synchronization metric.

116. An apparatus for wireless communication, comprising:
a timing controller configured to determine whether a timing reference signal is received by the apparatus;
a metric generator configured to define a synchronization metric based on the determination, wherein the synchronization metric comprises a plurality of parameters indicative of timing reliability of a timing reference associated with the apparatus, and wherein the defining of the synchronization metric comprises comparing a plurality of parameters indicative of timing reliability of a first timing source with a plurality of parameters indicative of timing reliability of a second timing source; and
a transmitter configured to transmit the defined synchronization metric, wherein the transmission of the synchronization metric enables a wireless node to synchronize start and end times of timeslots of the wireless node to approximately equal start and end times of timeslots of the apparatus.

117. The apparatus of claim 116, wherein the timing reference signal comprises a satellite-based timing reference signal.

118. The apparatus of claim 116, wherein the timing reference signal comprises a GPS timing reference signal.

119. The apparatus of claim 116, wherein the timing reference signal relates to another synchronization metric associated with a second wireless node.

120. The apparatus of claim 116, wherein the timing controller is further configured to monitor for another synchronization metric transmitted by a second wireless node.

121. The apparatus of claim 116, wherein the synchronization metric is defined to prevent a race condition involving the apparatus synchronizing to timing of a second wireless node and the second wireless node synchronizing to timing of the apparatus.

122. The apparatus of claim 116, wherein the parameters of the synchronization metric indicate at least one of the group consisting of: whether an associated timing source is associated with a GPS signal, whether an associated timing source is associated with a stationary wireless node, whether an associated timing source is associated with a mobile wireless node, whether an associated timing source is associated with a wired access point, and a quality of a clock source of an associated wireless node.

123. The apparatus of claim 116, wherein the parameters of the synchronization metric comprise at least one indication relating to at least one of the group consisting of: a number of node hops to a timing source, a random number, and a sequence number.

124. The apparatus of claim 116, wherein the transmission of the synchronization metric provides another timing reference signal for another wireless node.

125. The apparatus of claim 116, wherein a range associated with the transmission of the synchronization metric is greater than a range associated with transmission of data communication by the apparatus.

126. The apparatus of claim 116, further comprising a receiver configured to receive the timing reference signal via a second wireless node that is associated with the apparatus.

127. The apparatus of claim 116, further comprising a timing generator configured to distribute timing associated with the synchronization metric to a set of wireless nodes associated with the apparatus.

128. The apparatus of claim 127, wherein:
the apparatus receives the timing reference signal via a second wireless node;
the second wireless node is one of the nodes of the set of wireless nodes; and
the apparatus comprises a root node for the set of wireless nodes.

129. The apparatus of claim 116, further comprising:
a receiver configured to receive another synchronization metric associated with a second wireless node;
a metric selector configured to determine whether the received synchronization metric has a higher timing reliability than the defined synchronization metric; and
a synchronization controller configured to synchronize to another timing reference signal associated with the received synchronization metric based on the determination.

130. The apparatus of claim 116, further comprising a receiver configured to receive a first synchronization metric associated with the timing reference signal from a second wireless node, and further configured to receive a second synchronization metric associated with another timing reference signal from a third wireless node, wherein:
the second synchronization metric is identical to the first synchronization metric;
the metric generator is further configured to select a third synchronization metric having a higher timing reliability than a timing reliability associated with the first and second synchronization metrics; and
the transmitter is further configured to transmit the selected synchronization metric to enable the apparatus and the second wireless node to synchronize to timing associated with the selected synchronization metric.

131. The apparatus of claim 116, wherein:
the timing controller is further configured to determine that the apparatus is receiving, from a second wireless node, timing reference signals associated with a second synchronization metric;
the timing controller is further configured to determine that timing reference signals associated with the second synchronization metric are no longer being received from the second wireless node; and
the apparatus further comprises a synchronization controller configured to identify and synchronize to other timing reference signals that are associated with the second synchronization metric and that are provided by a third wireless node.

132. The apparatus of claim 116, wherein:
the timing controller is further configured to determine that the apparatus is receiving, from a second wireless node, timing reference signals associated with a second synchronization metric;
the timing controller is further configured to determine that timing reference signals associated with the second synchronization metric are no longer being received at the apparatus;
the apparatus further comprises a metric selector configured to select a highest timing reliability synchronization metric from a plurality of received synchronization metrics; and
the apparatus further comprises a synchronization controller configured to synchronize to timing associated the selected synchronization metric.

133. An apparatus for wireless communication, comprising:
means for determining whether a timing reference signal is received by the apparatus;
means for defining a synchronization metric based on the determination, wherein the synchronization metric comprises a plurality of parameters indicative of timing reliability of a timing reference associated with the apparatus, and wherein the defining of the synchronization metric comprises comparing a plurality of parameters indicative of timing reliability of a first timing source with a plurality of parameters indicative of timing reliability of a second timing source; and
means for transmitting the defined synchronization metric, wherein the transmission of the synchronization metric enables a wireless node to synchronize start and end times of timeslots of the wireless node to approximately equal start and end times of timeslots of the apparatus.

134. The apparatus of claim 133, wherein the timing reference signal comprises a satellite-based timing reference signal.

135. The apparatus of claim 133, wherein the timing reference signal comprises a GPS timing reference signal.

136. The apparatus of claim 133, wherein the timing reference signal relates to another synchronization metric associated with a second wireless node.

137. The apparatus of claim 133, wherein the means for determining monitors for another synchronization metric transmitted by a second wireless node.

138. The apparatus of claim 133, wherein the synchronization metric is defined to prevent a race condition involving the apparatus synchronizing to timing of a second wireless node and the second wireless node synchronizing to timing of the apparatus.

139. The apparatus of claim 133, wherein the parameters of the synchronization metric indicate at least one of the group consisting of: whether an associated timing source is associated with a GPS signal, whether an associated timing source is associated with a stationary wireless node, whether an associated timing source is associated with a mobile wireless node, whether an associated timing source is associated with a wired access point, and a quality of a clock source of an associated wireless node.

140. The apparatus of claim 133, wherein the parameters of the synchronization metric comprise at least one indication relating to at least one of the group consisting of: a number of node hops to a timing source, a random number, and a sequence number.

141. The apparatus of claim 133, wherein the transmission of the synchronization metric provides another timing reference signal for another wireless node.

142. The apparatus of claim 133, wherein a range associated with the transmission of the synchronization metric is greater than a range associated with transmission of data communication by the apparatus.

143. The apparatus of claim 133, further comprising means for receiving the timing reference signal via a second wireless node that is associated with the apparatus.

144. The apparatus of claim 133, further comprising means for distributing timing associated with the synchronization metric to a set of wireless nodes associated with the apparatus.

145. The apparatus of claim 144, wherein:
the apparatus receives the timing reference signal via a second wireless node;
the second wireless node is one of the nodes of the set of wireless nodes; and
the apparatus comprises a root node for the set of wireless nodes.

146. The apparatus of claim 133, further comprising:
means for receiving another synchronization metric associated with a second wireless node;
means for determining whether the received synchronization metric has a higher timing reliability than the defined synchronization metric; and
means for synchronizing to another timing reference signal associated with the received synchronization metric based on the determination.

147. The apparatus of claim 133, further comprising means for receiving a first synchronization metric associated with the timing reference signal from a second wireless node, and further for receiving a second synchronization metric associated with another timing reference signal from a third wireless node, wherein:
the second synchronization metric is identical to the first synchronization metric;
the means for defining selects a third synchronization metric having a higher timing reliability than a timing reliability associated with the first and second synchronization metrics; and
the means for transmitting transmits the selected synchronization metric to enable the apparatus and the second wireless node to synchronize to timing associated with the selected synchronization metric.

148. The apparatus of claim 133, wherein:
the means for determining determines that the apparatus is receiving, from a second wireless node, timing reference signals associated with a second synchronization metric;
the means for determining determines that timing reference signals associated with the second synchronization metric are no longer being received from the second wireless node; and
the apparatus further comprises means for identifying and synchronizing to other timing reference signals that are associated with the second synchronization metric and that are provided by a third wireless node.

149. The apparatus of claim 133, wherein:
the means for determining determines that the apparatus is receiving, from a second wireless node, timing reference signals associated with a second synchronization metric;
the means for determining determines that timing reference signals associated with the second synchronization metric are no longer being received at the apparatus;
the apparatus further comprises means for selecting a highest timing reliability synchronization metric from a plurality of received synchronization metrics; and
the apparatus further comprises means for synchronizing to timing associated the selected synchronization metric.

150. A computer-program product for wireless communication, comprising:
computer-readable storage device comprising codes executable by at least one computer to:
determine whether a timing reference signal is received by a first wireless node; and
define a synchronization metric based on the determination, wherein the synchronization metric comprises a plurality of parameters indicative of timing reliability of a timing reference associated with the first wireless node, and wherein the defining of the synchronization metric comprises comparing a plurality of parameters indicative of timing reliability of a first timing source with a plurality of parameters indicative of timing reliability of a second timing source; and
transmit the defined synchronization metric, wherein the transmission of the synchronization metric enables another wireless node to synchronize start and end times of timeslots of the other wireless node to approximately equal start and end times of timeslots of the first wireless node.

151. An access point for wireless communication, comprising:
an antenna;
a timing controller configured to determine whether a timing reference signal is received by the access point via the antenna;
a metric generator configured to define a synchronization metric based on the determination, wherein the synchronization metric comprises a plurality of parameters indicative of timing reliability of a timing reference associated with the access point, and wherein the defining of the synchronization metric comprises comparing a plurality of parameters indicative of timing reliability of a first timing source with a plurality of parameters indicative of timing reliability of a second timing source; and
a transmitter configured to transmit the defined synchronization metric, wherein the transmission of the synchronization metric enables a wireless node to synchronize start and end times of timeslots of the wireless node to approximately equal start and end times of timeslots of the access point.

152. An access terminal for wireless communication, comprising:
a timing controller configured to determine whether a timing reference signal is received by the access terminal;
a metric generator configured to define a synchronization metric based on the determination, wherein the synchronization metric comprises a plurality of parameters indicative of timing reliability of a timing reference associated with the access terminal, and wherein the defining of the synchronization metric comprises comparing a plurality of parameters indicative of timing reliability of a first timing source with a plurality of parameters indicative of timing reliability of a second timing source;

a transmitter configured to transmit the defined synchronization metric, wherein the transmission of the synchronization metric enables a wireless node to synchronize start and end times of timeslots of the wireless node to approximately equal start and end times of timeslots of the access terminal; and a user interface configured to output an indication based on data that is received according to timing that is based on the defined synchronization metric.

153. The method of claim 99, wherein the synchronization metric is defined if the determination indicates that the timing reference signal is not received by the first wireless node.

* * * * *